(12) United States Patent
Hu et al.

(10) Patent No.: US 11,044,734 B2
(45) Date of Patent: Jun. 22, 2021

(54) BEAM INDICATION METHOD, NETWORK DEVICE, AND TERMINAL

(71) Applicant: Huawei Technologies Co., Ltd., Shenzhen (CN)

(72) Inventors: Xingxing Hu, Shanghai (CN); Tianle Deng, Shenzhen (CN); Kaijie Zhou, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 39 days.

(21) Appl. No.: 16/357,645

(22) Filed: Mar. 19, 2019

(65) Prior Publication Data

US 2019/0215845 A1 Jul. 11, 2019

Related U.S. Application Data

(63) Continuation of application No. PCT/CN2017/103821, filed on Sep. 27, 2017.

(30) Foreign Application Priority Data

Sep. 29, 2016 (CN) .................. 201610872316.9

(51) Int. Cl.
*H04J 3/00* (2006.01)
*H04W 72/12* (2009.01)
*H04W 74/08* (2009.01)
*H04W 72/04* (2009.01)
*H04W 52/02* (2009.01)

(52) U.S. Cl.
CPC .......... *H04W 72/12* (2013.01); *H04W 52/02* (2013.01); *H04W 72/04* (2013.01); *H04W 72/046* (2013.01); *H04W 72/0446* (2013.01); *H04W 74/0833* (2013.01); *Y02D 30/70* (2020.08)

(58) Field of Classification Search
None
See application file for complete search history.

(56) References Cited

U.S. PATENT DOCUMENTS

| 2012/0127932 A1 | 5/2012 | Gao et al. |
| 2013/0039345 A1 | 2/2013 | Kim et al. |
| 2013/0155847 A1 | 6/2013 | Li et al. |
| 2013/0331081 A1 | 12/2013 | Rune et al. |
| 2014/0314167 A1 | 10/2014 | Jeong et al. |

(Continued)

FOREIGN PATENT DOCUMENTS

| CN | 101848541 A | 9/2010 |
| CN | 105324944 A | 2/2016 |

(Continued)

*Primary Examiner* — Phirin Sam
(74) *Attorney, Agent, or Firm* — Slater Matsil, LLP

(57) ABSTRACT

A method includes obtaining, by a network device, scheduling time information of at least one beam, where the scheduling time information of the at least one beam includes scheduling time information of a first beam currently accessed by a terminal, and is used to instruct the terminal to receive or send a signal at a scheduling time indicated by the scheduling time information of the at least one beam; and sending, by the network device, first indication information to the terminal, where the first indication information is used to indicate the scheduling time information of the at least one beam.

17 Claims, 17 Drawing Sheets

(56) References Cited

U.S. PATENT DOCUMENTS

| | | | |
|---|---|---|---|
| 2016/0036571 A1* | 2/2016 | Park | H04B 17/382 |
| | | | 370/330 |
| 2016/0095003 A1 | 3/2016 | Yu et al. | |
| 2016/0192387 A1 | 6/2016 | Bae | |
| 2016/0352625 A1* | 12/2016 | Kim | H04L 1/188 |
| 2017/0273058 A1* | 9/2017 | Agiwal | H04B 7/0617 |
| 2017/0366244 A1* | 12/2017 | Lee | H04B 7/0619 |
| 2020/0204320 A1* | 6/2020 | Yum | H04L 5/0048 |
| 2020/0403689 A1* | 12/2020 | Rofougaran | H04B 7/0413 |
| 2021/0014847 A1* | 1/2021 | Deng | H04W 72/046 |

FOREIGN PATENT DOCUMENTS

| | | |
|---|---|---|
| CN | 105850224 A | 8/2016 |
| EP | 2679053 A1 | 1/2014 |
| WO | 2015110153 A1 | 7/2015 |
| WO | 2016143994 A1 | 9/2016 |

\* cited by examiner

CONT. FROM FIG. 14A

S1406. The network device sends third indication information to the terminal, where the third indication information is used to indicate that the beam currently accessed by the terminal needs to be switched from the first beam to the third beam

CONT. FROM FIG. 14A

S1407. The terminal receives the third indication information sent by the network device S1408. The terminal starts, based on the third indication information, to switch the currently accessed beam from the first beam to the third beam S1409. The terminal obtains random access time information of the third beam S1410. The terminal determines scheduling time information of the third beam based on the random access time information of the third beam S1411. The terminal receives or sends, based on the first indication information and the scheduling time information of the third beam, a signal at a scheduling time indicated by the scheduling time information of the at least one beam and the scheduling time information of the third beam

FIG. 14B

BEAM INDICATION METHOD, NETWORK DEVICE, AND TERMINAL

CROSS-REFERENCE TO RELATED APPLICATIONS

This application is a continuation of International Application No. PCT/CN2017/103821, filed on Sep. 27, 2017, which claims priority to Chinese Patent Application No. 201610872316.9, filed on Sep. 29, 2016. The disclosures of the aforementioned applications are hereby incorporated by reference in their entireties.

TECHNICAL FIELD

The present invention relates to the field of wireless communications technologies, and in particular, to a beam indication method, a network device, and a terminal.

BACKGROUND

As communication technologies develop, a technology of using a plurality of antennas to form a high-antenna-gain simulated narrow beam is introduced to enlarge a radio coverage area of a high frequency band. As shown in FIG. 1, due to antenna cost limitations on a base station side, each transmission point (TP) managed by a base station can form only a few beams at any given moment. For example, each TP can form one or two beams at any given moment. As a result, user equipment (UE) scheduled by a network side at any given moment can only be within coverage of the few beams. User equipment (UE) not within the coverage of the few beams cannot detect a physical downlink control channel (PDCCH) through listening.

Based on a discontinuous reception (DRX) mode in an existing Long Term Evolution (LTE) mechanism, if UE detects, in a subframe, through listening that a PDCCH indicates a new data transmission, the UE needs to listen on the PDCCH in a subsequent time period. In addition, based on a non-DRX mode in the existing LTE mechanism, the UE needs to keep listening on a PDCCH. However, for the technology of using a beam to enlarge a coverage area of a high frequency band, UE may actually not be scheduled by the network side at a moment when the UE listens on a PDCCH. Therefore, at this moment, the UE cannot detect a PDCCH behavior through listening at all. As a result, power consumption of the UE is relatively large.

SUMMARY

Embodiments of the present invention provide a beam indication method, a network device, and a terminal, to resolve at least a problem that power consumption of UE is relatively large when a technology of using a beam to enlarge a coverage area of a high frequency band is used with an existing LTE mechanism.

According to an aspect, an embodiment of the present invention provides a beam indication method. The method includes: obtaining, by a network device, scheduling time information of at least one beam, where the scheduling time information of the at least one beam includes scheduling time information of a first beam currently accessed by a terminal, and is used to instruct the terminal to receive or send a signal at a scheduling time indicated by the scheduling time information of the at least one beam. The method also includes sending, by the network device, first indication information to the terminal, where the first indication information is used to indicate the scheduling time information of the at least one beam.

According to the beam indication method provided in this embodiment of the present invention, in this embodiment of the present invention, the network device may obtain the scheduling time information of the at least one beam, and send, to the terminal, the first indication information indicating the scheduling time information of the at least one beam. The scheduling time information of the at least one beam includes the scheduling time information of the first beam currently accessed by the terminal, and is used to instruct the terminal to receive or send a signal at the scheduling time indicated by the scheduling time information of the at least one beam. In this way, at least the terminal does not need to listen to scheduling control information (for example, a PDCCH) at a time other than a scheduling time indicated by the scheduling time information of the first beam currently accessed by the terminal. This matches the scheduling time arrangement made by a network side for a terminal in coverage of the first beam, and reduces power consumption of the terminal, or can cause the terminal to perform some other measurement actions, for example, measuring signal quality of each beam.

In a possible design, the scheduling time information of the at least one beam includes a mapping relationship between a scheduling time of each beam of the at least one beam and the beam, or a scheduling time of each beam of the at least one beam.

In a possible design, the scheduling time information of the at least one beam further includes scheduling time information of one or more beams of all beams corresponding to the network device other than the first beam.

In this way, when the terminal is in an overlapping coverage area of a plurality of beams, besides transmitting data at the scheduling time indicated by the scheduling time information of the first beam currently accessed by the terminal, the terminal may transmit data at a scheduling time indicated by the scheduling time information of the one or more beams of all the beams corresponding to the network device other than the first beam, so that a system bandwidth resource can be fully utilized and a system throughput can be increased.

In a possible design, the scheduling time information of the at least one beam includes scheduling time information of all beams in a first beam set, where the first beam set is a beam set that includes the first beam and that is of one or more beam sets obtained after the network device groups all the beams corresponding to the network device.

In a possible design, the scheduling time information of the at least one beam includes scheduling time information of all beams in a first beam set, where the first beam set is a beam set that includes the first beam and that is of one or more beam sets obtained after the network device groups all the beams corresponding to the network device.

In other words, to avoid a frequent change of a beam accessed by the terminal, a plurality of beams may be grouped, and the network device may make the terminal listen to scheduling moments of the plurality of beams. To be specific, the network device notifies the terminal of only a corresponding listening moment, but does not indicate which beam is to be listened to. In this way, even if the beam accessed by the terminal changes, provided that a newly accessed beam is still in an original beam set, the network side does not need to notify the terminal of scheduling time information of the new beam, thereby saving system radio resources. Certainly, in this case, when the terminal is in an overlapping coverage area of the plurality of beams, besides transmitting data at the scheduling time indicated by the scheduling time information of the first beam currently accessed by the terminal, the terminal may transmit data at a scheduling time indicated by scheduling time information of one or more beams of all the beams in the first beam set other than the first beam, so that a system bandwidth resource can be fully utilized and a system throughput can be increased.

In a possible design, the sending, by the network device, first indication information to the terminal includes: sending, by the network device, the first indication information to the terminal using a broadcast message; or sending, by the network device, the first indication information to the terminal using a Medium Access Control (MAC) control element message; or sending, by the network device, the first indication information to the terminal using a dedicated Radio Resource Control (RRC) message.

In a possible design, before the obtaining, by a network device, scheduling time information of at least one beam, the method further includes: receiving, by the network device, a request message sent by the terminal, where the request message is used to request the network device to obtain the scheduling time information of the at least one beam; and the obtaining, by a network device, scheduling time information of at least one beam includes: obtaining, by the network device, the scheduling time information of the at least one beam based on the request message.

That is, in this possible design, the network device obtains the scheduling time information of the at least one beam only after receiving, from the terminal, the request message for requesting to obtain the scheduling time information of the at least one beam. This solution is more feasible when a beam accessed by the terminal does not change frequently.

In a possible design, after the sending, by the network device, first indication information to the terminal, the method further includes: receiving, by the network device, second indication information sent by the terminal, where the second indication information is used to indicate that an error occurs when the network device sends first data using the first beam; and sending, by the network device, the first data to the terminal using a second beam, where the second beam is a beam of the at least one beam.

According to the beam indication method provided in this possible design, the data can be retransmitted after a data transmission error occurs. Therefore, reception performance of the terminal can be improved.

In a possible design, the method further includes: sending, by the network device, third indication information to the terminal, where the third indication information is used to indicate that a beam currently accessed by the terminal needs to be switched from the first beam to a third beam.

In this possible design, because scheduling time information of a target beam (namely, the third beam in this possible design) and a source beam (namely, the first beam in this possible design) can be obtained in a switching process, the terminal can perform data transmission based on the scheduling time information in the switching process, thereby reducing a service interruption time.

In a possible design, the scheduling time information of the at least one beam further includes scheduling time information of the third beam.

That is, the scheduling time information of the third beam may be explicitly indicated to the terminal by the network device, and the terminal does not need to obtain, using another approach, the scheduling time information of the third beam after receiving the third indication information.

In a possible design, after the sending, by the network device, first indication information to the terminal, the method further includes: obtaining, by the network device, the scheduling time information of the third beam; and sending, by the network device, fourth indication information to the terminal, where the fourth indication information is used to indicate the scheduling time information of the third beam.

In this possible design, because scheduling time information of a target beam (namely, the third beam in this possible design) and a source beam (namely, the first beam in this possible design) can be obtained in a switching process, the terminal can perform data transmission based on the scheduling time information in the switching process, thereby reducing a service interruption time. In addition, in this possible design, the scheduling time information of the third beam may be explicitly indicated to the terminal by the network device, and the terminal does not need to obtain, using another approach, the scheduling time information of the third beam after receiving the third indication information.

According to another aspect, a beam indication method is provided. The method includes: receiving, by a terminal, first indication information sent by a network device, where the first indication information is used to indicate scheduling time information of at least one beam, and the scheduling time information of the at least one beam includes scheduling time information of a first beam currently accessed by the terminal, and is used to instruct the terminal to receive or send a signal at a scheduling time indicated by the scheduling time information of the at least one beam. The method also includes receiving or sending, by the terminal based on the first indication information, a signal at the scheduling time indicated by the scheduling time information of the at least one beam.

According to the beam indication method provided in this embodiment of the present invention, in this embodiment of the present invention, the terminal may receive, from the network device, the first indication information indicating the scheduling time information of the at least one beam. The scheduling time information of the at least one beam includes the scheduling time information of the first beam currently accessed by the terminal, and is used to instruct the terminal to receive or send a signal at the scheduling time indicated by the scheduling time information of the at least one beam. In this way, at least the terminal does not need to listen to scheduling control information (for example, a PDCCH) at a time other than a scheduling time indicated by the scheduling time information of the first beam currently accessed by the terminal. This matches the scheduling time arrangement made by a network side for a terminal in coverage of the first beam, and reduces power consumption of the terminal, or can cause the terminal to perform some other measurement actions, for example, measuring signal quality of each beam.

In a possible design, the scheduling time information of the at least one beam includes a mapping relationship between a scheduling time of each beam of the at least one beam and the beam, or a scheduling time of each beam of the at least one beam.

In a possible design, the scheduling time information of the at least one beam further includes scheduling time information of one or more beams of all beams corresponding to the network device other than the first beam.

In this way, when the terminal is in an overlapping coverage area of a plurality of beams, besides transmitting data at the scheduling time indicated by the scheduling time information of the first beam currently accessed by the terminal, the terminal may transmit data at a scheduling time indicated by the scheduling time information of the one or more beams of all the beams corresponding to the network device other than the first beam, so that a system bandwidth resource can be fully utilized and a system throughput can be increased.

In a possible design, the scheduling time information of the at least one beam includes scheduling time information of all beams in a first beam set, where the first beam set is a beam set that includes the first beam and that is of one or more beam sets obtained after the network device groups all the beams corresponding to the network device.

In other words, to avoid a frequent change of a beam accessed by the terminal, a plurality of beams may be grouped, and the network device may make the terminal listen to scheduling moments of the plurality of beams. To be specific, the network device notifies the terminal of only a corresponding listening moment, but does not indicate which beam is to be listened to. In this way, even if the beam accessed by the terminal changes, provided that a newly accessed beam is still in an original beam set, the network side does not need to notify the terminal of scheduling time information of the new beam, thereby saving system radio resources. Certainly, in this case, when the terminal is in an overlapping coverage area of the plurality of beams, besides transmitting data at the scheduling time indicated by the scheduling time information of the first beam currently accessed by the terminal, the terminal may transmit data at a scheduling time indicated by scheduling time information of one or more beams of all the beams in the first beam set other than the first beam, so that a system bandwidth resource can be fully utilized and a system throughput can be increased.

In a possible design, before the receiving, by a terminal, first indication information sent by a network device, the method further includes: sending, by the terminal, a request message to the network device, where the request message is used to request the network device to obtain the scheduling time information of the at least one beam.

In this way, the network device obtains the scheduling time information of the at least one beam only after receiving, from the terminal, the request message for requesting to obtain the scheduling time information of the at least one beam. This solution is more feasible when a beam accessed by the terminal does not change frequently.

In a possible design, if an error occurs when the terminal receives first data that is sent by the network device using the first beam, after the receiving or sending, by the terminal based on the first indication information, a signal at the scheduling time indicated by the scheduling time information of the at least one beam, the method further includes: sending, by the terminal, second indication information to the network device, where the second indication information is used to indicate that an error occurs when the network device sends the first data using the first beam; receiving, by the terminal, the first data that is sent by the network device by using a second beam, where the second beam is a beam of the at least one beam; and combining, by the terminal, the first data that is sent by the network device using the second beam and the first data that is sent by the network device using the first beam, and decoding combined first data.

According to the beam indication method provided in this possible design, the data can be retransmitted after a data transmission error occurs. Therefore, reception performance of the terminal can be improved.

In a possible design, before the receiving or sending, by the terminal based on the first indication information, a signal at the scheduling time indicated by the scheduling time information of the at least one beam, the method further includes: receiving, by the terminal, third indication information sent by the network device, where the third indication information is used to indicate that a beam currently accessed by the terminal needs to be switched from the first beam to a third beam; obtaining, by the terminal, random access time information of the third beam; and determining, by the terminal, scheduling time information of the third beam based on the random access time information of the third beam. The receiving or sending, by the terminal based on the first indication information, a signal at the scheduling time indicated by the scheduling time information of the at least one beam includes: receiving or sending, by the terminal based on the first indication information and the scheduling time information of the third beam, a signal at a scheduling time indicated by the scheduling time information of the at least one beam and the scheduling time information of the third beam.

In this possible design, because scheduling time information of a target beam (namely, the third beam in this possible design) and a source beam (namely, the first beam in this possible design) can be obtained in a switching process, the terminal can perform data transmission based on the scheduling time information in the switching process, thereby reducing a service interruption time.

In a possible design, before the receiving or sending, by the terminal based on the first indication information, a signal at the scheduling time indicated by the scheduling time information of the at least one beam, the method further includes: receiving, by the terminal, third indication information sent by the network device, where the third indication information is used to indicate that a beam currently accessed by the terminal needs to be switched from the first beam to a third beam; and the scheduling time information of the at least one beam further includes scheduling time information of the third beam.

In this possible design, because scheduling time information of a target beam (namely, the third beam in this possible design) and a source beam (namely, the first beam in this possible design) can be obtained in a switching process, the terminal can perform data transmission based on the scheduling time information in the switching process, thereby reducing a service interruption time. In addition, in this possible design, the scheduling time information of the third beam may be explicitly indicated to the terminal by the network device, and the terminal does not need to obtain, by using another approach, the scheduling time information of the third beam after receiving the third indication information.

In a possible design, after the receiving or sending, by the terminal based on the first indication information, a signal at the scheduling time indicated by the scheduling time information of the at least one beam, the method further includes: receiving, by the terminal, third indication information sent by the network device, where the third indication information is used to indicate that a beam currently accessed by the terminal needs to be switched from the first beam to a third beam; obtaining, by the terminal, random access time information of the third beam; determining, by the terminal, scheduling time information of the third beam based on the random access time information of the third beam; and receiving or sending, by the terminal based on the first indication information and the scheduling time information of the third beam, a signal at a scheduling time indicated by the scheduling time information of the at least one beam and the scheduling time information of the third beam.

In this possible design, because scheduling time information of a target beam (namely, the third beam in this possible design) and a source beam (namely, the first beam in this possible design) can be obtained in a switching process, the terminal can perform data transmission based on the scheduling time information in the switching process, thereby reducing a service interruption time. In addition, the network device may send, to the terminal before switching, the first indication information indicating the scheduling time information of the at least one beam, where the scheduling time information of the at least one beam includes the scheduling time information of the first beam currently accessed by the terminal, and is used to instruct the terminal to receive or send a signal at the scheduling time indicated by the scheduling time information of the at least one beam. In this way, at least the terminal does not need to listen to scheduling control information (for example, a PDCCH) at a time other than a scheduling time indicated by the scheduling time information of the first beam currently accessed by the terminal. This matches the scheduling time arrangement made by a network side for a terminal in coverage of the first beam, and reduces power consumption of the terminal, or can cause the terminal to perform some other measurement actions, for example, measuring signal quality of each beam.

In a possible design, the scheduling time information of the at least one beam further includes scheduling time information of a third beam; and after the receiving or sending, by the terminal based on the first indication information, a signal at the scheduling time indicated by the scheduling time information of the at least one beam, the method further includes: receiving, by the terminal, third indication information sent by the network device, where the third indication information is used to indicate that a beam currently accessed by the terminal needs to be switched from the first beam to the third beam; and receiving or sending, by the terminal based on the first indication information, a signal at the scheduling time indicated by the scheduling time information of the at least one beam.

In this possible design, because scheduling time information of a target beam (namely, the third beam in this possible design) and a source beam (namely, the first beam in this possible design) can be obtained in a switching process, the terminal can perform data transmission based on the scheduling time information in the switching process, thereby reducing a service interruption time. In addition, the network device may send, to the terminal before switching, the first indication information indicating the scheduling time information of the at least one beam, where the scheduling time information of the at least one beam includes the scheduling time information of the first beam currently accessed by the terminal, and is used to instruct the terminal to receive or send a signal at the scheduling time indicated by the scheduling time information of the at least one beam. In this way, at least the terminal does not need to listen to scheduling control information (for example, a PDCCH) at a time other than a scheduling time indicated by the scheduling time information of the first beam currently accessed by the terminal. This matches the scheduling time arrangement made by a network side for a terminal in coverage of the first beam, and reduces power consumption of the terminal, or can cause the terminal to perform some other measurement actions, for example, measuring signal quality of each beam. In addition, in this possible design, the scheduling time information of the third beam may be explicitly indicated to the terminal by the network device, and the terminal does not need to obtain, using another approach, the scheduling time information of the third beam after receiving the third indication information.

In a possible design, after the receiving or sending, by the terminal based on the first indication information, a signal at the scheduling time indicated by the scheduling time information of the at least one beam, the method further includes: receiving, by the terminal, third indication information sent by the network device, where the third indication information is used to indicate that a beam currently accessed by the terminal needs to be switched from the first beam to a third beam; receiving, by the terminal, fourth indication information sent by the network device, where the fourth indication information is used to indicate scheduling time information of the third beam; and receiving or sending, by the terminal based on the first indication information and the fourth indication information, a signal at a scheduling time indicated by the scheduling time information of the at least one beam and the scheduling time information of the third beam.

In this possible design, because scheduling time information of a target beam (namely, the third beam in this possible design) and a source beam (namely, the first beam in this possible design) can be obtained in a switching process, the terminal can perform data transmission based on the scheduling time information in the switching process, thereby reducing a service interruption time. In addition, the network device may send, to the terminal before switching, the first indication information indicating the scheduling time information of the at least one beam, where the scheduling time information of the at least one beam includes the scheduling time information of the first beam currently accessed by the terminal, and is used to instruct the terminal to receive or send a signal at the scheduling time indicated by the scheduling time information of the at least one beam. In this way, at least the terminal does not need to listen to scheduling control information (for example, a PDCCH) at a time other than a scheduling time indicated by the scheduling time information of the first beam currently accessed by the terminal. This the matches scheduling time arrangement made by a network side for a terminal in coverage of the first beam, and reduces power consumption of the terminal, or can cause the terminal to perform some other measurement actions, for example, measuring signal quality of each beam. In addition, in this possible design, the scheduling time information of the third beam may be explicitly indicated to the terminal by the network device, and the terminal does not need to obtain, using another approach, the scheduling time information of the third beam after receiving the third indication information.

According to still another aspect, an embodiment of the present invention provides a network device. The network device includes a processing module and a transceiver module. The processing module is configured to obtain scheduling time information of at least one beam, where the scheduling time information of the at least one beam includes scheduling time information of a first beam currently accessed by a terminal, and is used to instruct the terminal to receive or send a signal at a scheduling time indicated by the scheduling time information of the at least one beam. The transceiver module is configured to send first indication information to the terminal, where the first indication information is used to indicate the scheduling time information of the at least one beam.

In a possible design, the scheduling time information of the at least one beam includes a mapping relationship between a scheduling time of each beam of the at least one beam and the beam, or a scheduling time of each beam of the at least one beam.

In a possible design, the scheduling time information of the at least one beam further includes scheduling time information of one or more beams of all beams corresponding to the network device other than the first beam.

In a possible design, the scheduling time information of the at least one beam includes scheduling time information of all beams in a first beam set, where the first beam set is a beam set that includes the first beam and that is of one or more beam sets obtained after the network device groups all the beams corresponding to the network device.

In a possible design, the transceiver module is configured to send the first indication information to the terminal using a broadcast message; or send the first indication information to the terminal using a Medium Access Control (MAC) control element message; or send the first indication information to the terminal using a dedicated Radio Resource Control (RRC) message.

In a possible design, before the processing module obtains the scheduling time information of the at least one beam, the transceiver module is further configured to receive a request message sent by the terminal, where the request message is used to request the network device to obtain the scheduling time information of the at least one beam; and the processing module is configured to obtain the scheduling time information of the at least one beam based on the request message.

In a possible design, after the transceiver module sends the first indication information to the terminal, the transceiver module is further configured to receive second indication information sent by the terminal, where the second indication information is used to indicate that an error occurs when the network device sends first data by using the first beam; and the transceiver module is further configured to send the first data to the terminal using a second beam, where the second beam is a beam of the at least one beam.

In a possible design, the transceiver module is further configured to send third indication information to the terminal, where the third indication information is used to indicate that a beam currently accessed by the terminal needs to be switched from the first beam to a third beam.

In a possible design, the scheduling time information of the at least one beam further includes scheduling time information of the third beam.

In a possible design, after the transceiver module sends the first indication information to the terminal, the processing module is further configured to obtain the scheduling time information of the third beam; and the transceiver module is further configured to send fourth indication information to the terminal, where the fourth indication information is used to indicate the scheduling time information of the third beam.

The network device provided in this embodiment of the present invention may be configured to perform the foregoing beam indication methods. Therefore, for technical effects that can be obtained by the terminal, refer to the foregoing method embodiments. Details are not described herein again.

According to still another aspect, an embodiment of the present invention provides a terminal. The terminal includes a transceiver module. The transceiver module is configured to receive first indication information sent by a network device, where the first indication information is used to indicate scheduling time information of at least one beam, and the scheduling time information of the at least one beam includes scheduling time information of a first beam currently accessed by the terminal, and is used to instruct the terminal to receive or send a signal at a scheduling time indicated by the scheduling time information of the at least one beam. The transceiver module is further configured to receive or send, based on the first indication information, a signal at the scheduling time indicated by the scheduling time information of the at least one beam.

In a possible design, the scheduling time information of the at least one beam includes a mapping relationship between a scheduling time of each beam of the at least one beam and the beam, or a scheduling time of each beam of the at least one beam.

In a possible design, the scheduling time information of the at least one beam further includes scheduling time information of one or more beams of all beams corresponding to the network device other than the first beam.

In a possible design, the scheduling time information of the at least one beam includes scheduling time information of all beams in a first beam set, where the first beam set is a beam set that includes the first beam and that is of one or more beam sets obtained after the network device groups all the beams corresponding to the network device.

In a possible design, before the transceiver module receives the first indication information sent by the network device, the transceiver module is further configured to send a request message to the network device, where the request message is used to request the network device to obtain the scheduling time information of the at least one beam.

In a possible design, the terminal further includes a processing module, where if an error occurs when the terminal receives first data that is sent by the network device by using the first beam, after the transceiver module sends/receives, based on the first indication information, a signal at the scheduling time indicated by the scheduling time information of the at least one beam, the transceiver module is further configured to send second indication information to the network device, where the second indication information is used to indicate that an error occurs when the network device sends the first data by using the first beam. The transceiver module is further configured to receive the first data that is sent by the network device by using a second beam, where the second beam is a beam of the at least one beam. The processing module is configured to combine the first data that is sent by the network device using the second beam and the first data that is sent by the network device using the first beam, and decode combined first data.

In a possible design, the terminal further includes the processing module. Before the transceiver module sends/receives, based on the first indication information, a signal at the scheduling time indicated by the scheduling time information of the at least one beam, the transceiver module is further configured to receive third indication information sent by the network device, where the third indication information is used to indicate that a beam currently accessed by the terminal needs to be switched from the first beam to a third beam. The processing module is configured to obtain random access time information of the third beam. The processing module is further configured to determine scheduling time information of the third beam based on the random access time information of the third beam. The transceiver module is configured to receive or send, based on the first indication information and the scheduling time information of the third beam, a signal at a scheduling time indicated by the scheduling time information of the at least one beam and the scheduling time information of the third beam.

In a possible design, before the transceiver module sends/receives, based on the first indication information, a signal at the scheduling time indicated by the scheduling time information of the at least one beam, the transceiver module is further configured to receive third indication information sent by the network device, where the third indication information is used to indicate that a beam currently accessed by the terminal needs to be switched from the first beam to a third beam; and the scheduling time information of the at least one beam further includes scheduling time information of the third beam.

In a possible design, the terminal further includes the processing module. After the transceiver module sends/receives, based on the first indication information, a signal at the scheduling time indicated by the scheduling time information of the at least one beam, the transceiver module is further configured to receive third indication information sent by the network device, where the third indication information is used to indicate that a beam currently accessed by the terminal needs to be switched from the first beam to a third beam. The processing module is configured to obtain random access time information of the third beam, and determine scheduling time information of the third beam based on the random access time information of the third beam. The transceiver module is further configured to receive or send, based on the first indication information and the scheduling time information of the third beam, a signal at a scheduling time indicated by the scheduling time information of the at least one beam and the scheduling time information of the third beam.

In a possible design, the scheduling time information of the at least one beam further includes scheduling time information of a third beam. After the transceiver module sends/receives, based on the first indication information, a signal at the scheduling time indicated by the scheduling time information of the at least one beam, the transceiver module is further configured to receive third indication information sent by the network device, where the third indication information is used to indicate that a beam currently accessed by the terminal needs to be switched from the first beam to the third beam. The transceiver module is further configured to receive or send, based on the first indication information, a signal at the scheduling time indicated by the scheduling time information of the at least one beam.

In a possible design, after the transceiver module sends/receives, based on the first indication information, a signal at the scheduling time indicated by the scheduling time information of the at least one beam, the transceiver module is further configured to receive third indication information sent by the network device, where the third indication information is used to indicate that a beam currently accessed by the terminal needs to be switched from the first beam to a third beam. The transceiver module is further configured to receive fourth indication information sent by the network device, where the fourth indication information is used to indicate scheduling time information of the third beam. The transceiver module is further configured to receive or send, based on the first indication information and the fourth indication information, a signal at a scheduling time indicated by the scheduling time information of the at least one beam and the scheduling time information of the third beam.

The terminal provided in this embodiment of the present invention may be configured to perform the foregoing beam indication methods. Therefore, for technical effects that can be obtained by the terminal, refer to the foregoing method embodiments. Details are not described herein again.

According to still another aspect, an embodiment of the present invention provides a network device, where the network device can implement the functions performed by the network device in the foregoing method examples, and the functions may be implemented by hardware, or may be implemented by executing corresponding software by hardware. The hardware or software includes one or more modules corresponding to the foregoing functions.

In a possible design, a structure of the network device includes a processor and a transceiver, the processor is configured to enable the network device to perform a corresponding function in the foregoing methods, and the transceiver is configured to enable the network device to communicate with another network element. The network device may further include a memory, and the memory is configured to be coupled with the processor and store a program instruction and data required for the network device.

The network device provided in this embodiment of the present invention may be configured to perform the foregoing beam indication methods. Therefore, for technical effects that can be obtained by the network device, refer to the foregoing method embodiments. Details are not described herein again.

According to still another aspect, an embodiment of the present invention provides a terminal, where the terminal can implement the functions performed by the terminal in the foregoing method examples, and the functions may be implemented by hardware, or may be implemented by executing corresponding software by hardware. The hardware or software includes one or more modules corresponding to the foregoing functions.

In a possible design, a structure of the terminal includes a processor and a transceiver, the processor is configured to enable the terminal to perform a corresponding function in the foregoing methods, and the transceiver is configured to enable the terminal to communicate with another network element. The terminal may further include a memory, and the memory is configured to be coupled with the processor and store a program instruction and data required for the terminal.

The terminal provided in this embodiment of the present invention may be configured to perform the foregoing beam indication methods. Therefore, for technical effects that can be obtained by the terminal, refer to the foregoing method embodiments. Details are not described herein again.

According to still another aspect, an embodiment of the present invention provides a communications system, where the communications system includes the network device in the foregoing aspects and the terminal in the foregoing aspects.

According to yet another aspect, an embodiment of the present invention provides a computer storage medium, where the computer storage medium is configured to store a computer software instruction used by the foregoing network device, and the computer software instruction includes a program designed to perform the foregoing aspects.

According to yet another aspect, an embodiment of the present invention provides a computer storage medium, where the computer storage medium is configured to store a computer software instruction used by the foregoing terminal, and the computer software instruction includes a program designed to perform the foregoing aspects.

In conclusion, according to the beam indication method, the network device, and the terminal provided in the embodiments of the present invention, in the embodiments of the present invention, the network device may send, to the terminal, the first indication information indicating the scheduling time information of the at least one beam. The scheduling time information of the at least one beam includes the scheduling time information of the first beam currently accessed by the terminal, and is used to instruct the terminal to receive or send a signal at the scheduling time indicated by the scheduling time information of the at least one beam. In this way, at least the terminal does not need to listen to the scheduling control information (for example, a PDCCH) at the time other than the scheduling time indicated by the scheduling time information of the first beam currently accessed by the terminal. This matches the scheduling time arrangement made by a network side for a terminal in coverage of the first beam, and reduces power consumption of the terminal, or can cause the terminal to perform some other measurement actions, for example, measuring signal quality of each beam.

BRIEF DESCRIPTION OF THE DRAWINGS

To describe the technical solutions in the embodiments of the present invention or in the prior art more clearly, the following briefly describes the accompanying drawings required for describing the embodiments or the prior art. Apparently, the accompanying drawings in the following description show merely some embodiments of the present invention, and a person of ordinary skill in the art may derive other drawings from these accompanying drawings without creative efforts.

FIG. 14A and FIG. 14B are a schematic flowchart of still another beam indication method according to an embodiment of the present invention;

DETAILED DESCRIPTION OF ILLUSTRATIVE EMBODIMENTS

Figure 1:
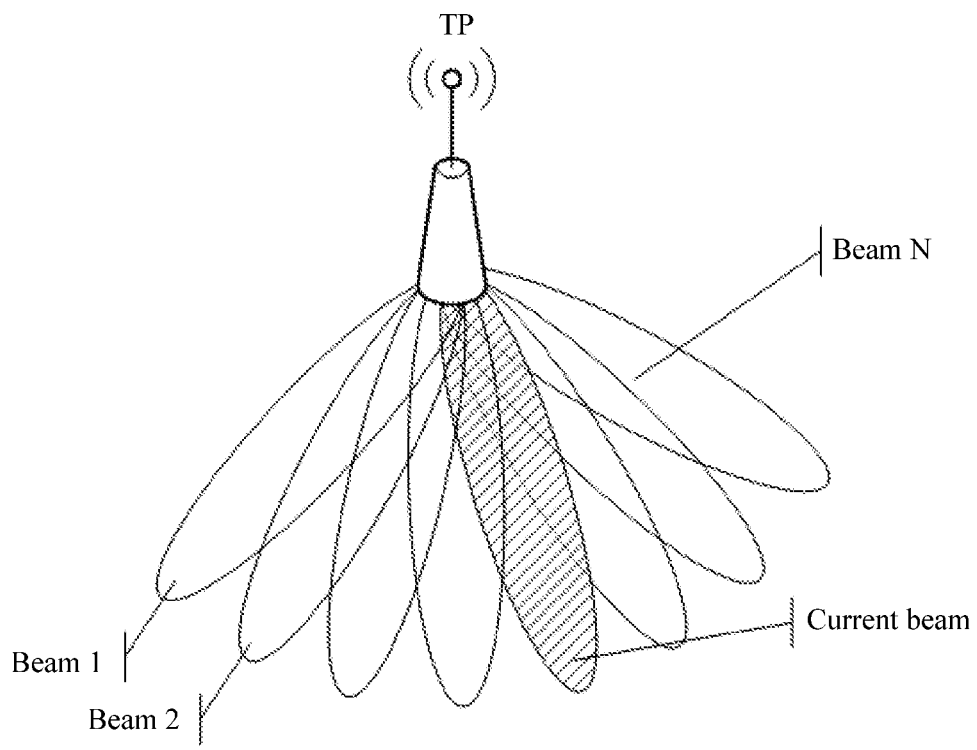
FIG. 1 is a schematic diagram of a time-division-based coverage scenario in which a simulated beam is used in a current system.

It should be noted that to clearly describe the technical solutions of the embodiments of the present invention, in the embodiments of the present invention, the terms "first", "second", and the like are used to distinguish same items or similar items whose functions are basically the same, and a person skilled in the art may understand that the terms "first", "second", and the like do not limit a quantity and an execution order.

It should be noted that, the character "/" in this specification represents the meaning of "or", for example, A/B may represent A or B; and the term "and/or" in this specification describes only an association relationship for describing associated objects and represents that three relationships may exist. For example, A and/or B may represent the following three cases: Only A exists, both A and B exist, and only B exists. "A plurality of" means two or more than two.

Terms such as "component", "module", and "system" used in this application are used to indicate computer-related entities. The computer-related entities may be hardware, firmware, a combination of hardware and software, software, or software in running. For example, a component may be but is not limited to, a process that runs on a processor, a processor, an object, an executable file, a thread of execution, a program, and/or a computer. In an example, both a computing device and an application that runs on the computing device may be components. One or more components may reside within a process and/or a thread of execution, and a component may be located on one computer and/or distributed into two or more computers. In addition, these components may be implemented in various computer-readable media that have various data structures. These components may communicate by using a local and/or remote process and based on, for example, a signal having one or more data packets (for example, data from one component, where the component interacts with another component in a local system or a distributed system, and/or interacts with other systems via a network such as the Internet by using a signal).

It should be noted that the term "example" or "for example" in the embodiments of the present invention means "used as an example, an illustration, or a description". Any embodiment or design scheme described as "example" or "for example" in the embodiments of the present invention should not be explained as being more preferred or having more advantages than another embodiment or design scheme. Exactly, use of the term "example", "for example", or another term is intended to present a concept in a specific manner.

It should be noted that in the embodiments of the present invention, unless otherwise stated, "a plurality of" means two or more than two. For example, a plurality of data packets refer to two or more data packets.

It should be noted that in the embodiments of the present invention, "of", "corresponding", and "corresponding" may be interchangeably used sometimes. It should be noted that consistent meanings are expressed when differences are not emphasized.

It should be noted that network architectures and service scenarios described in the embodiments of the present invention are intended to more clearly describe the technical solutions in the embodiments of the present invention, but are not intended to limit the technical solutions provided in the embodiments of the present invention. A person of ordinary skill in the art may be aware that as the network architectures evolve and a new service scenario emerges, the technical solutions provided in the embodiments of the present invention are further applicable to a similar technical problem.

The following describes the technical solutions in the embodiments of the present invention with reference to the accompanying drawings in the embodiments of the present invention.

The embodiments of the present invention may be applied to a wireless communications system, for example, a 4.5G or 5G communications system, and is specifically applicable to an application scenario in which a terminal interacts with a network device in the 4.5G or 5G communications system. The 4.5G or 5G communications system can support different services, different deployment scenarios, and different frequency spectra. The service may be, for example, an enhanced mobile broadband (eMBB) service, a machine type communication (MTC) service, an ultra-reliable and low latency communications (URLLC) service, and a multimedia broadcast multicast service (MBMS), or a positioning service. The deployment scenario may be, for example, an indoor hotspot scenario, a dense urban scenario, a suburban scenario, an urban macro coverage scenario, or a high-speed railway scenario. The frequency spectrum may be, for example, any frequency range below 100 GHz.

Figure 2:
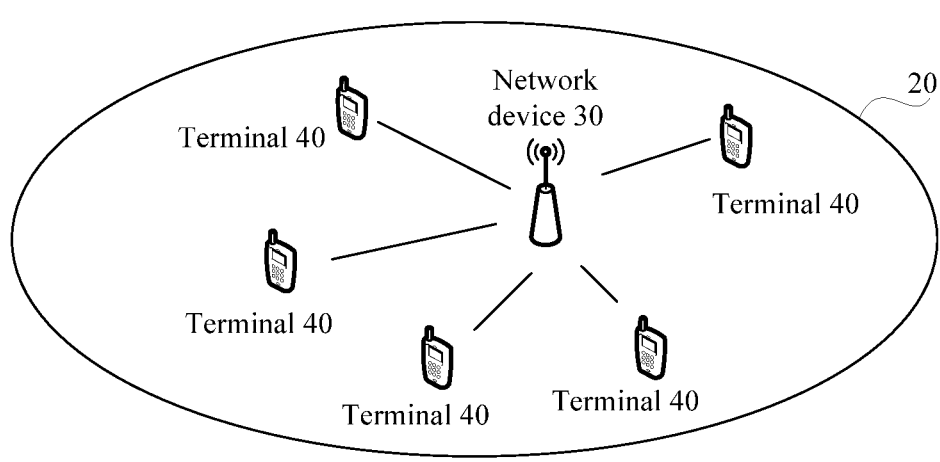
FIG. 2 is a schematic architectural diagram of a communications system according to an embodiment of the present invention.

FIG. 2 is a network structure diagram of a communications system 20 according to an embodiment of the present invention. The communications system 20 includes a network device 30 and a terminal 40.

In this embodiment of the present invention, the network device 30 may be a base station, a TP managed by a base station, or the like. The base station is a device deployed on a radio access network and used to provide a wireless communication function. In a 4.5G or 5G communications system, a device providing a network device function includes an evolved NodeB (eNB), a new radio NodeB (gNB), a centralized unit (CU), a distributed unit, a new radio controller, and the like. This is not specifically limited in this embodiment of the present invention.

In this embodiment of the present invention, the terminal 40 is a device providing voice and/or data connectivity for a user, and includes a wireless terminal or a wired terminal. The wireless terminal may be a handheld device with a wireless connection function, another processing device connected to a wireless modem, or a mobile terminal that communicates with one or more core networks using a radio access network. For example, the wireless terminal may be a mobile phone (also referred to as a "cellular" phone) and a computer with a mobile terminal. For another example, the wireless terminal may be a portable, pocket-sized, handheld, computer built-in, or in-vehicle mobile apparatus. For still another example, the wireless terminal may be a mobile station, an access point, or a part of UE. This is not specifically limited in this embodiment of the present invention.

Figure 3:
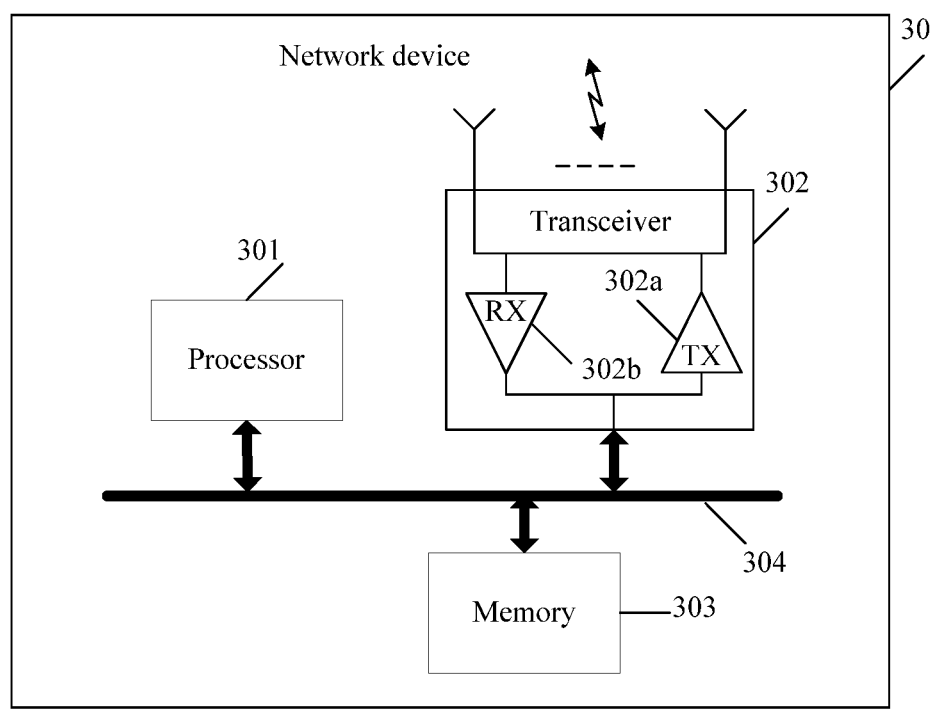
FIG. 3 is a schematic structural diagram of hardware of a network device according to an embodiment of the present invention.

FIG. 3 is a schematic structural diagram of hardware of a network device 30 according to an embodiment of the present invention. The network device 30 includes a processor 301, a transceiver 302, a memory 303, and a bus 304. The processor 301, the transceiver 302, and the memory 303 are connected to each other using the bus 304. The transceiver 302 includes a transmitter Tx 302a and a receiver Rx 302b, and is connected to an antenna or antenna array 305.

The processor 301 is a control center of the network device 30, and is connected to various parts of the entire network device 30 using the bus 304. The processor 301 performs various functions of the network device 30 and processes data by running or executing a software program and/or a module stored in the memory 303 and invoking data stored in the memory 303, so as to perform overall monitoring on the network device 30. Optionally, the processor 301 may include one or more processing units. Preferably, a modem processor may be integrated into the processor 301, and the modem processor is mainly responsible for wireless communication.

The transceiver 302 may be configured to receive/send information or receive/send a signal during a call. Specially, the transceiver 302 receives an uplink signal of a terminal 40 and then sends the uplink signal to the processor 301 for processing. In addition, the transceiver 302 sends a downlink signal to the terminal 40.

The memory 303 may be configured to store a software program and a module. The processor 301 runs the software program and the module stored in the memory 303, so as to execute various functional applications of the network device 30 and implement data processing. The memory 303 mainly includes a program storage area and a data storage area. The program storage area may store an operating system, an application program required for at least one function (for example, a beam indication function), and the like. The data storage area may store data created based on usage of the network device 30 (for example, scheduling time information of at least one beam), and the like. In addition, the memory 303 may include a high-speed random access memory, or may include a non-volatile memory such as at least one magnetic disk storage device, a flash memory device, or another volatile solid-state storage device.

The bus 304 may be a peripheral component interconnect (PCI) bus, an extended industry standard architecture (EISA) bus, or the like. The bus may be categorized as an address bus, a data bus, a control bus, or the like. For ease of indication, the bus is indicated using only one thick line in FIG. 3. However, it does not indicate that there is only one bus or only one type of bus.

Figure 4:
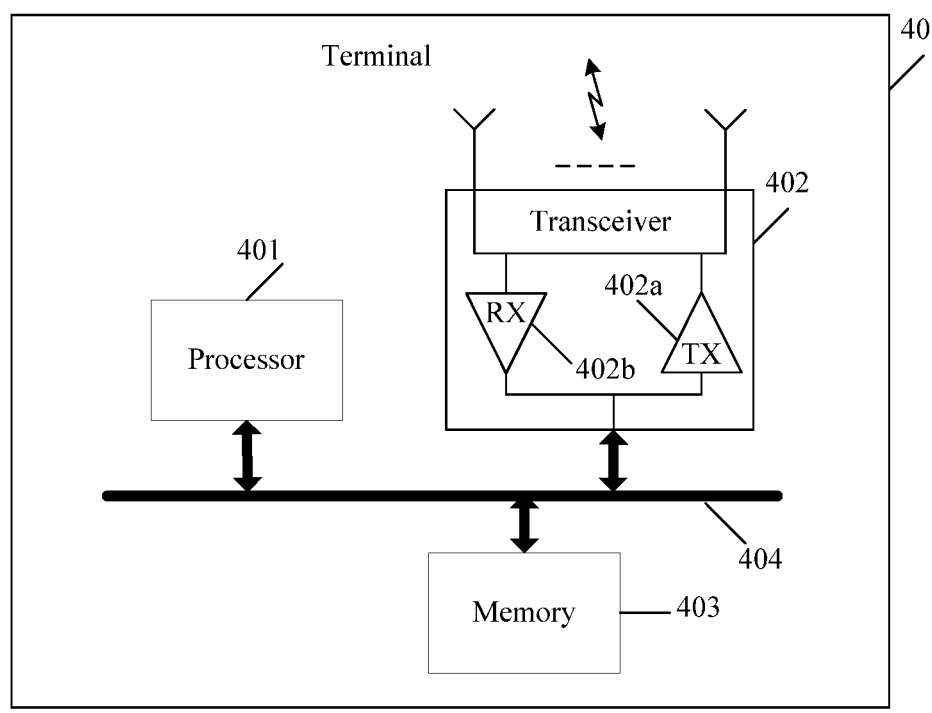
FIG. 4 is a schematic structural diagram of hardware of a terminal according to an embodiment of the present invention.

FIG. 4 is a schematic structural diagram of hardware of a terminal 40 according to an embodiment of the present invention. The terminal 40 includes a processor 401, a transceiver 402, a memory 403, and a bus 404. The processor 401, the transceiver 402, and the memory 403 are connected to each other by using the bus 404. The transceiver 402 includes a transmitter Tx 402a and a receiver Rx 402b, and is connected to an antenna or antenna array 405.

The processor 401 is a control center of the terminal 40, is connected to various pails of the entire terminal 40 using the bus 404, and performs various functions of the terminal 40 and processes data by running or executing a software program and/or a module stored in the memory 403 and invoking data stored in the memory 403, so as to perform overall monitoring on the terminal 40. Optionally, the processor 401 may include one or more processing units. Preferably, a modem processor may be integrated into the processor 401, and the modem processor is mainly responsible for wireless communication.

The transceiver 402 may be configured to receive/send information or receive/send a signal during a call. Specially, the transceiver 402 receives a downlink signal of a network device 30 and then sends the downlink signal to the processor 401 for processing. In addition, the transceiver 402 sends an uplink signal to the network device 30.

The memory 403 may be configured to store a software program and a module. The processor 401 runs the software program and the module stored in the memory 403, so as to execute various functional applications of the terminal 40 and implement data processing. The memory 403 mainly includes a program storage area and a data storage area. The program storage area may store an operating system, an application program required for at least one function (for example, a beam indication function), and the like. The data storage area may store data created based on usage of the terminal 40 (for example, scheduling time information of at least one beam), and the like. In addition, the memory 403 may include a high-speed random access memory, or may include a non-volatile memory such as at least one magnetic disk storage device, a flash memory device, or another volatile solid-state storage device.

The bus 404 may be a peripheral component interconnect (PCI) bus, an extended industry standard architecture (EISA) bus, or the like. The bus may be categorized as an address bus, a data bus, a control bus, or the like. For ease of indication, the bus is indicated using only one thick line in FIG. 4. However, it does not indicate that there is only one bus or only one type of bus.

Although not shown, the terminal 40 may further include a camera, a display, an audio circuit, a plurality of sensors, and/or the like. This is not specifically limited in this embodiment of the present invention.

Figure 5:
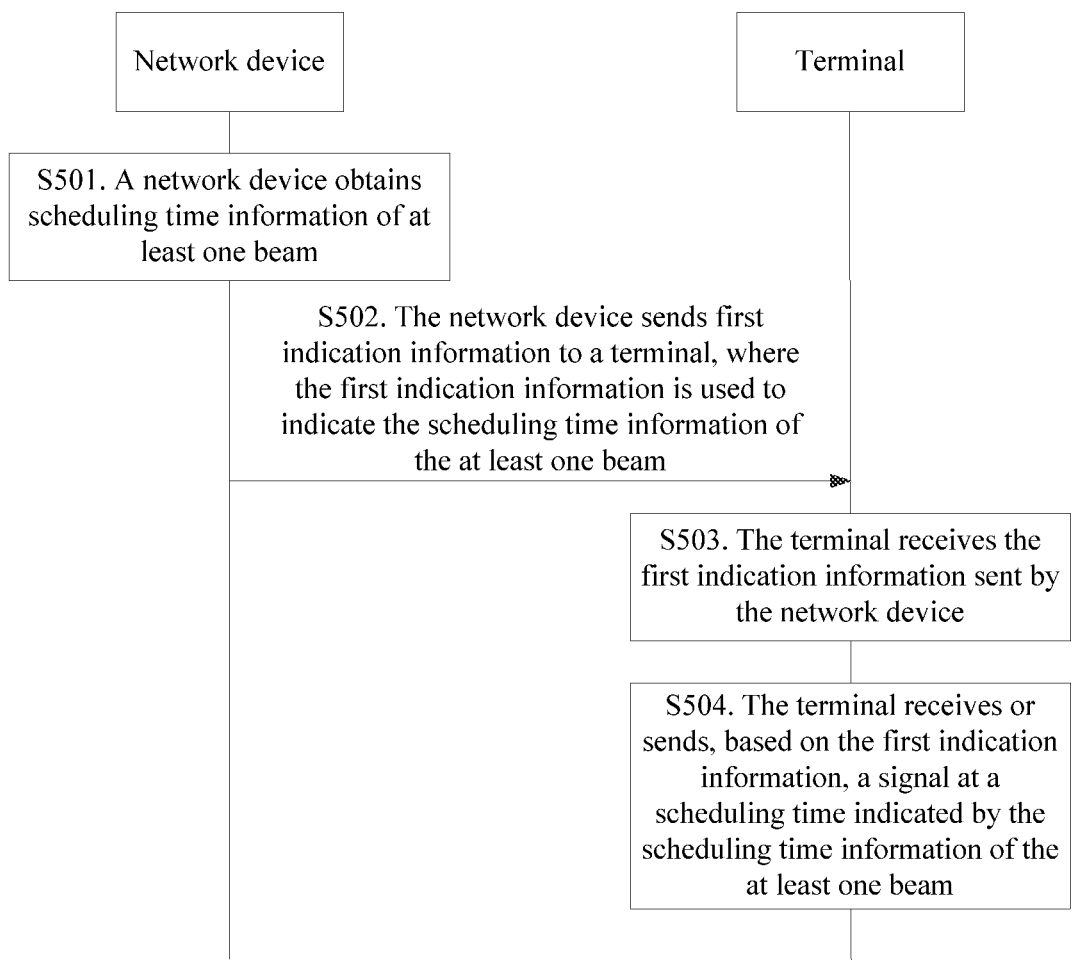
FIG. 5 is a schematic flowchart of a beam indication method according to an embodiment of the present invention.

Based on the communications system 20 shown in FIG. 2, an embodiment of the present invention provides a beam indication method. As shown in FIG. 5, the method includes the following steps S501 to S504.

S501. A network device obtains scheduling time information of at least one beam.

The scheduling time information of the at least one beam includes scheduling time information of a first beam currently accessed by a terminal, and is used to instruct the terminal to receive or send a signal at a scheduling time indicated by the scheduling time information of the at least one beam.

S502. The network device sends first indication information to a terminal, where the first indication information is used to indicate the scheduling time information of the at least one beam.

S503. The terminal receives the first indication information sent by the network device.

S504. The terminal receives or sends, based on the first indication information, a signal at a scheduling time indicated by the scheduling time information of the at least one beam.

In step S501 of this embodiment of the present invention, the scheduling time information of the at least one beam may include a mapping relationship between a scheduling time of each beam of the at least one beam and the beam, or a scheduling time of each beam of the at least one beam. The mapping relationship between the scheduling time of each beam and the beam may be specifically a mapping relationship between the scheduling time of each beam and a beam ID corresponding to the beam. The scheduling time of each beam may specifically include a scheduling start moment of the beam. Optionally, the scheduling time of each beam may further specifically include a scheduling end moment of the beam.

Figure 6:
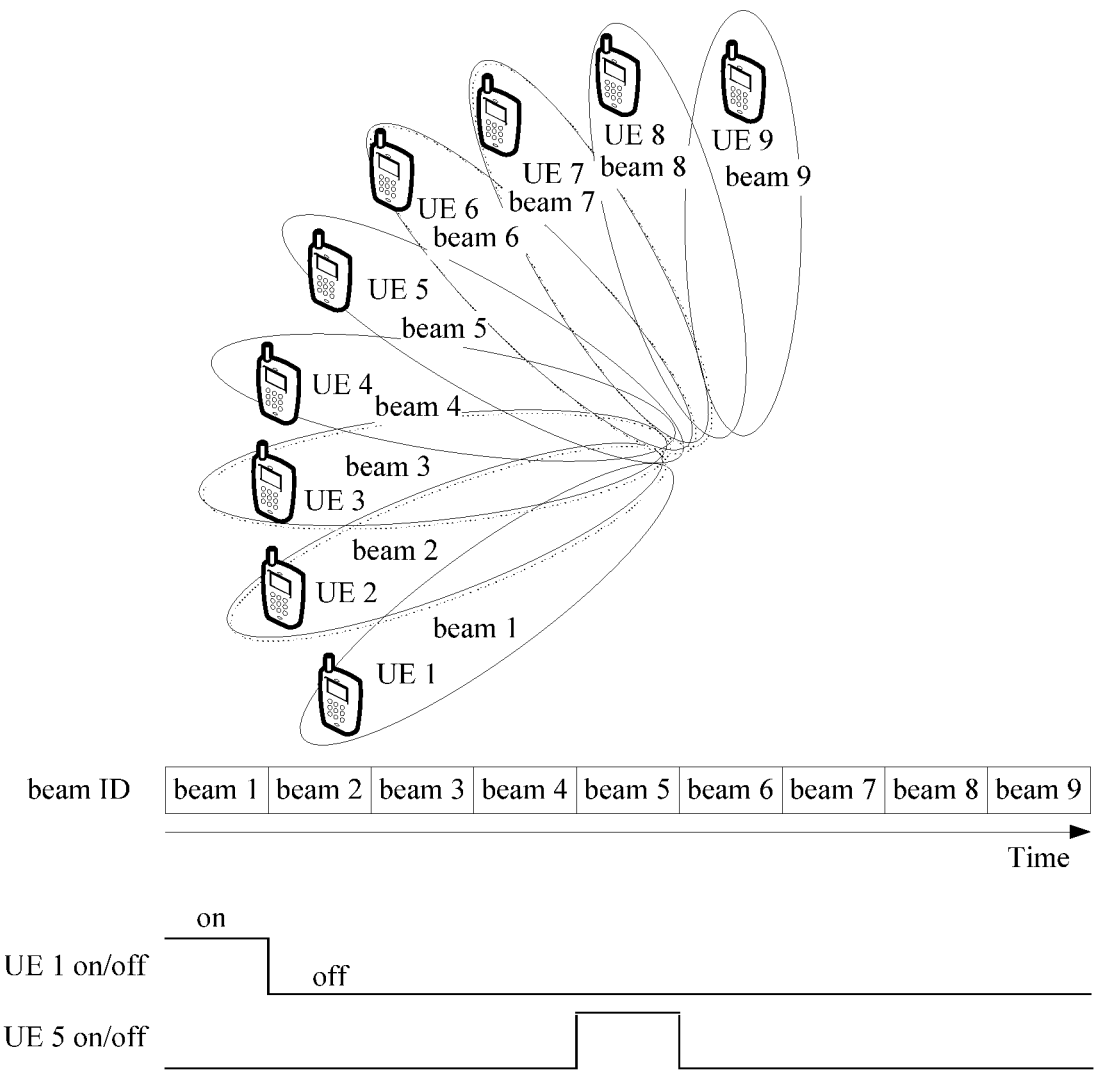
FIG. 6 is a schematic diagram of a time-division-based coverage scenario in which a simulated beam is used according to an embodiment of the present invention.

For example, as shown in FIG. 6, a TP may correspond to nine beams: a beam 1 to a beam 9. The scheduling time information of the at least one beam may include scheduling the beam 1 at a moment 1, scheduling the beam 5 at a moment 5, and the like. In other words, the scheduling time information of the at least one beam may indicate both identifier information of the beam and the scheduling time information of the beam. Certainly, the scheduling time information of the at least one beam may alternatively include: performing scheduling at a moment 1, performing scheduling at a moment 5, and the like. In other words, the scheduling time information of the at least one beam may indicate only the scheduling time information of the beam.

Specifically, the network device may obtain the scheduling time information of the at least one beam in the following manner.

The network device obtains, through calculation, scheduling time arrangement of each beam based on a quantity of services of each beam and a quantity of terminals; or when the terminal is in a coverage area of a plurality of TPs, the network device may negotiate scheduling time arrangement of each beam with the plurality of TPs; or the network device receives measurement report information of the terminal, where the measurement report information carries beam IDs of several beams that have good signal quality and that have been known to the terminal, and a network side negotiates scheduling time arrangement of the beams in the corresponding beams.

It should be noted that in this embodiment of the present invention, the scheduling time information of the beam is actually forming time information of the beam, or may be considered as scheduling time information of the terminal in coverage of the beam; and in this embodiment of the present invention, scheduling a beam actually means forming a beam, or may be considered as scheduling a terminal in coverage of a beam. Description is provided herein, and details are not described again in the following.

It should be noted that the scheduling time indicated by the scheduling time information in this embodiment of the present invention may be continuous or not. This is not specifically limited in this embodiment of the present invention.

For example, the network device may indicate that scheduling time information of a current serving beam is 10001000, that is, scheduling is performed at a moment 1 and a moment 5, and is not performed at other moments, and duration of this instruction is 10 ms. Alternatively, the network device may indicate that scheduling time information of a current serving beam is 11110000, that is, scheduling is performed at a moment 1, a moment 2, a moment 3, and a moment 4, and is not performed at other moments, and duration of this instruction is 10 ms.

It should be noted that the beam in the present invention may be a narrow beam or a wide beam, and the wide beam may also correspond to one cell. Description is provided herein, and details are not described again in the following.

It should be noted that because whether there is UE in each beam and a quantity of UEs in each beam may change over time, a time granularity of the scheduling time information of the beam should be a small. Description is provided herein, and details are not described again in the following.

In step S502 of this embodiment of the present invention, the first indication information may be notified to the terminal using a broadcast message, or may be notified to the terminal using a Medium Access Control (MAC) control element message, or may be notified to the terminal using a Radio Resource Control (RRC) message. This is not specifically limited in this embodiment of the present invention.

Content of the first indication information may indicate a subsequent time period within which the terminal does not need to listen to whether the at least one beam is scheduled to the terminal. For example, the content of the first indication information may indicate the subsequent time period in a form of a subframe or a transmission time interval (TTI). Alternatively, content of the first indication information may indicate scheduling time arrangement of the at least one beam in a subsequent time period. For example, the content of the first indication information may indicate the scheduling time arrangement in a form of a bitmap. The first indication information may carry both a beam ID and a scheduling time corresponding to each beam of the at least one beam; or may carry only a scheduling time of the beam. That is, the network device may notify a terminal of only a scheduling time of the terminal, but may not specifically notify the terminal of a specific beam of the scheduling time, and the terminal only needs to receive or send a signal in a beam that is accessed by the terminal at the corresponding scheduling time, which means after a beam currently accessed by the terminal changes, the terminal still receives or sends a signal at the corresponding scheduling time.

For example, assuming that the beam currently accessed by the terminal is a beam 1 and that the network device obtains a scheduling time of the beam 1, a beam ID of the beam 1, a scheduling time of a beam 2, and a beam ID of the beam 2 in step S501, the network device may send the scheduling time of the beam 1 to the terminal using the first indication information, and the terminal determines the beam ID of the beam 1, the scheduling time of the beam 2, and the beam ID of the beam 2 based on the scheduling time of the beam 1 and a rule negotiated in advance by the terminal and the network device. A specific implementation of determining, by the terminal, the beam ID of the beam 1, the scheduling time of the beam 2, and the beam ID of the beam 2 based on the scheduling time of the beam 1 and a rule negotiated in advance by the terminal and the network device may be as follows. When the terminal accesses the beam 1, the terminal may learn of the beam ID of the beam 1 using a reference signal or access time arrangement. After the terminal has accessed the beam 1, the terminal may learn of the beam ID of the beam 2 with relatively good signal quality by measuring signal quality of an adjacent beam. The terminal may determine, based on the scheduling time of the beam 1 indicated by the scheduling time information in the first indication information, that a time other than the scheduling time of the beam 1 is the scheduling time of the beam 2. Optionally, in this embodiment of the present invention, after learning of the beam ID of the beam 2 with relatively good signal quality, the terminal may report the beam ID of the beam 2 to the network device, so that the network device can learn of the beam ID of the beam 2.

For example, assuming that the network device obtains a scheduling time of a beam 1, a beam ID of the beam 1, a scheduling time of a beam 2, and a beam ID of the beam 2 in step S501, the network device may send the scheduling time of the beam 1 and the beam ID of the beam 1 to the terminal using the first indication information, and the terminal determines the scheduling time of the beam 2 and the beam ID of the beam 2 based on the scheduling time of the beam 1, the beam ID of the beam 1, and a rule negotiated in advance by the terminal and the network device; or the network device may send the scheduling time of the beam 2 and the beam ID of the beam 2 to the terminal using the first indication information, and the terminal determines the scheduling time of the beam 1 and the beam ID of the beam 1 based on the scheduling time of the beam 2, the beam ID of the beam 2, and a rule negotiated in advance by the terminal and the network device. For specific implementation, refer to the foregoing example. Details are not described herein again.

Certainly, assuming that the network device obtains a scheduling time of a beam 1, a beam ID of the beam 1, a scheduling time of a beam 2, and a beam ID of the beam 2 in step S501, the network device may send the scheduling time of the beam 1, the beam ID of the beam 1, the scheduling time of the beam 2, and the beam ID of the beam 2 to the terminal using the first indication information. This is not specifically limited in this embodiment of the present invention.

Optionally, the first indication information may be specific to a terminal, or may be specific to all terminals in coverage of the at least one beam. For example, if the first indication information is scrambled using a public network temporary identifier (RNTI), all terminals can know the first indication information. If the first indication information is scrambled using a specific-terminal RNTI, the first indication information may be notified to each terminal.

It should be noted that in this embodiment of the present invention, each beam of the at least one beam may correspond to a different RNTI, and the network side may notify, using a broadcast message, a MAC control element message, or an RRC message, the terminal of RNTIs corresponding to different beams. This is not specifically limited in this embodiment of the present invention.

Optionally, the network device may send the first indication information or the RNTIs corresponding to the terminal in different beams to the terminal using another frequency, for example, send the first indication information or the RNTIs corresponding to the terminal in different beams to the terminal using a broadcast message, a MAC control element message, or an RRC message in a low frequency. The first indication information or the RNTIs corresponding to the terminal in different beams may be notified to the terminal using a same message or different messages. This is not specifically limited in this embodiment of the present invention.

In step S504 of this embodiment of the present invention, that the terminal receives or sends, based on the first indication information, a signal at a scheduling time indicated by the scheduling time information of the at least one beam is specifically: the terminal may determine the scheduling time information of the at least one beam based on the first indication information, so that the terminal can listen to scheduling control information (for example, a PDCCH) in the at least one beam in a corresponding time based on the scheduling time information of the at least one beam, to determine whether the network device schedules the terminal in a corresponding beam. In other words, the terminal may receive, based on the first indication information, a downlink signal at the scheduling time indicated by the scheduling time information of the at least one beam; or the terminal may send, based on the first indication information, an uplink signal at the scheduling time indicated by the scheduling time information of the at least one beam.

Each TP can form only a few beams at a specific moment, for example, one or two beams. Therefore, actually, at a specific moment, the terminal receives or sends a signal at a scheduling time indicated by scheduling time information of a few beams, formed at the moment, of the at least one beam, instead of receiving or sending a signal at a scheduling time indicated by scheduling time information of all beams of the at least one beam.

According to the beam indication method provided in this embodiment of the present invention, in this embodiment of the present invention, the network device may send, to the terminal, the first indication information indicating the scheduling time information of the at least one beam. The scheduling time information of the at least one beam includes the scheduling time information of the first beam currently accessed by the terminal, and is used to instruct the terminal to receive or send a signal at the scheduling time indicated by the scheduling time information of the at least one beam. In this way, at least the terminal does not need to listen to scheduling control information (for example, a PDCCH) at a time other than a scheduling time indicated by the scheduling time information of the first beam currently accessed by the terminal. This well matches scheduling time arrangement made by the network side for a terminal in coverage of the first beam, and reduces power consumption of the terminal, or can cause the terminal to perform some other measurement actions, for example, measuring signal quality of each beam.

Further, in this embodiment of the present invention, the scheduling time information of the at least one beam may further include scheduling time information of one or more beams of all beams corresponding to the network device other than the first beam.

For example, the scheduling time information of the at least one beam includes scheduling time information of all the beams corresponding to the network device. In this way, the terminal can learn of scheduling time information of each beam of all the beams, so that after the beam accessed by the terminal changes, the terminal still knows scheduling time information of a newly accessed beam. In other words, the network device does not need to notify the terminal of the scheduling time information of the newly accessed beam, thereby saving system radio resources.

Specifically, when the network device is a base station, all the beams corresponding to the network device actually include all beams managed by the network device.

When the network device is a TP managed by a base station, all the beams corresponding to the network device actually include all beams managed by the base station serving the TP.

When the at least one beam includes a plurality of beams, any two of the plurality of beams may belong to a same cell or different cells. This is not specifically limited in this embodiment of the present invention.

In this way, when the terminal is in an overlapping coverage area of a plurality of beams, besides transmitting data at the scheduling time indicated by the scheduling time information of the first beam currently accessed by the terminal, the terminal may transmit data at a scheduling time indicated by the scheduling time information of the one or more beams of all the beams corresponding to the network device other than the first beam, so that a system bandwidth resource can be fully utilized and a system throughput can be increased.

Figure 7:
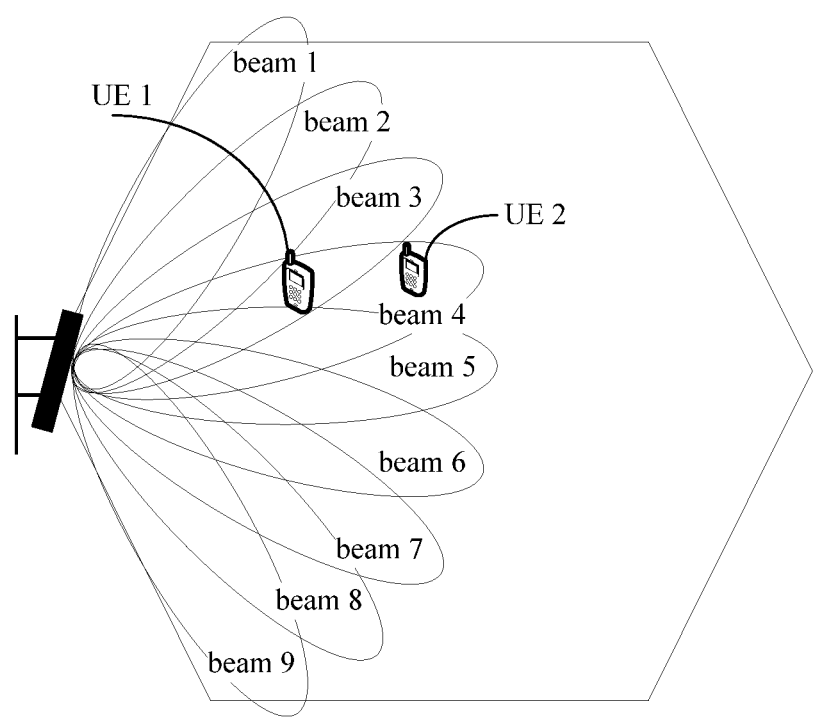
FIG. 7 is a schematic diagram of a scenario in which a terminal is in a coverage area of a plurality of beams according to an embodiment of the present invention.

For example, as shown in FIG. 7, assuming that the terminal in this embodiment of the present invention is specifically UE, if UE 1 is in an overlapping area of a beam 3 and a beam 4, the scheduling time information of the at least one beam may include scheduling time information of the beam 3 and scheduling time information of the beam 4. In this way, when the network side schedules UE 2 in coverage of the beam 3, if the UE 2 cannot fully utilize a bandwidth resource, the UE 1 may transmit data at a scheduling time indicated by the scheduling time information of the beam 3, so that a system radio resource can be fully utilized and a system throughput can be increased.

Certainly, if the scheduling time information of the at least one beam may further include the scheduling time information of the one or more beams of all beams corresponding to the network device other than the first beam, it is unnecessary to notify the terminal of scheduling time information of a new beam when a beam change is caused due to terminal movement, thereby saving system radio resources.

Optionally, in another possible design, the scheduling time information of the at least one beam includes scheduling time information of all beams in a first beam set, where the first beam set is a beam set that includes the first beam and that is of one or more beam sets obtained after the network device groups all the beams corresponding to the network device. Optionally, the network device may alternatively notify the terminal of scheduling time information corresponding to a plurality of beam sets. This is not specifically limited in this embodiment of the present invention.

In other words, to avoid a frequent change of the beam accessed by the terminal, a plurality of beams may be grouped to obtain one or more beam sets. The network device may make the terminal listen to scheduling moments of a plurality of beams in one or several beam sets, that is, the network device only notifies the terminal of a corresponding listening moment, but does not indicate which beam is to be listened on. In this way, even if the beam accessed by the terminal changes, provided that a newly accessed beam is still in the one or several beam sets, the network device does not need to notify the terminal of scheduling time information of the newly accessed beam, thereby saving system radio resources. Beams included in different beam sets may overlap. In other words, beams included in different beam sets may have a same beam ID. This is not specifically limited in this embodiment of the present invention.

Certainly, in this case, when the terminal is in an overlapping coverage area of the plurality of beams, besides transmitting data at the scheduling time indicated by the scheduling time information of the first beam currently accessed by the terminal, the terminal may transmit data at a scheduling time indicated by scheduling time information of one or more beams of all the beams in the first beam set other than the first beam, so that a system bandwidth resource can be fully utilized and a system throughput can be increased.

It is assumed that the first beam is a beam 3, and that the first beam set includes the beam 3 and a beam 4. If UE 1 is in an overlapping area of the beam 3 and the beam 4, for a related example, refer to the example corresponding to FIG. 7. Details are not described herein again.

Preferably, the scheduling time information of the at least one beam includes scheduling time information of an adjacent beam of the first beam currently accessed by the terminal, in addition to the scheduling time information of the first beam. The network device may determine the adjacent beam of the first beam in the following manner.

The network device listens to uplink signals sent by the terminal in all beams, and determines the adjacent beam of the first beam by comparing uplink signal quality of all the beams obtained through listening. For example, a beam whose uplink signal quality is better than a specific threshold is selected as the adjacent beam of the first beam. In addition, the network device may alternatively determine the adjacent beam of the first beam based on signal quality of all the beams that is obtained through listening and reported by the terminal. Alternatively, the terminal may report a beam ID of the adjacent beam of the first beam based on an event delivered by the network side. For example, a measurement event is reported when signal quality of the adjacent beam meets a specific condition.

Figure 8:
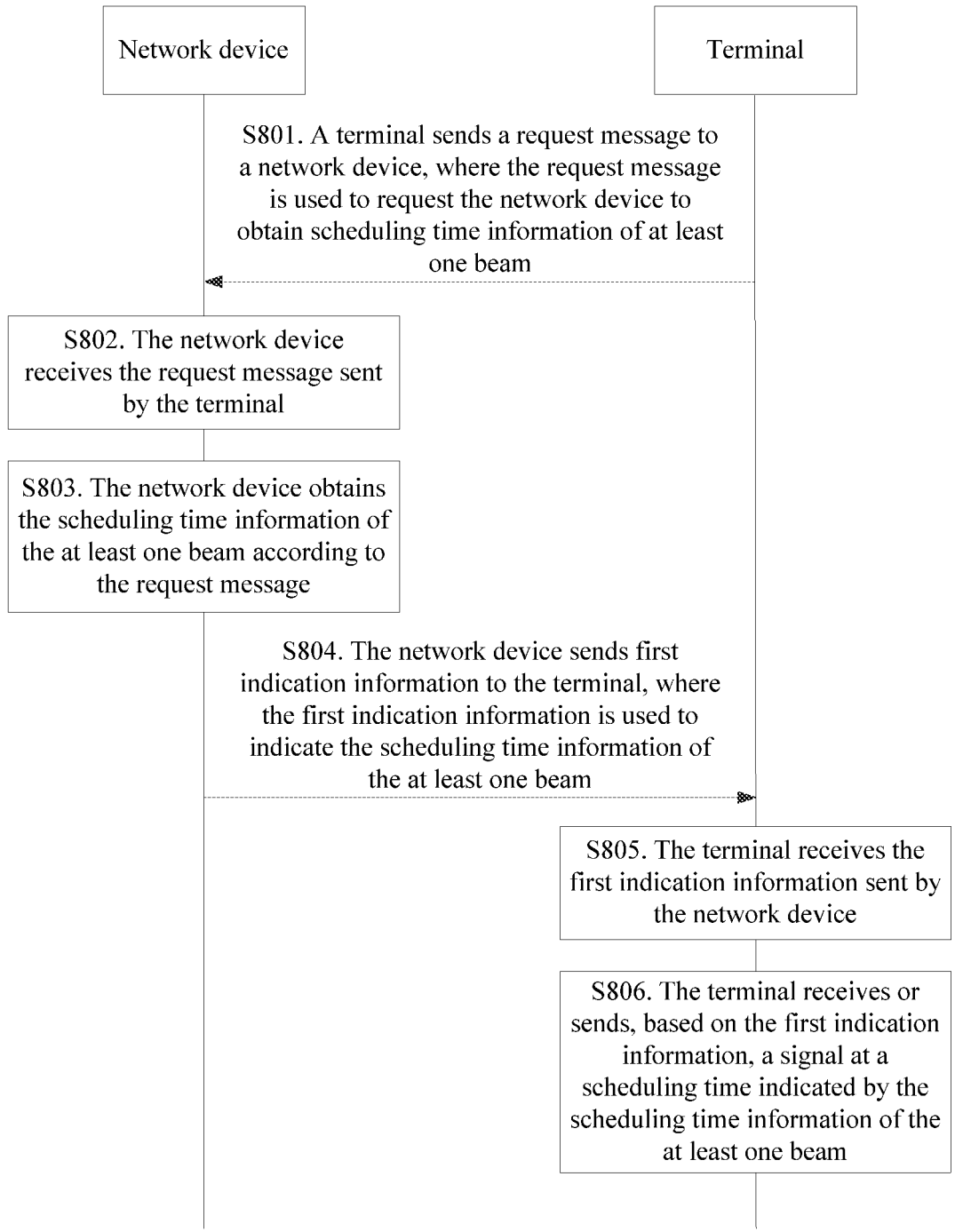
FIG. 8 is a schematic flowchart of another beam indication method according to an embodiment of the present invention.

Optionally, an embodiment of the present invention further provides a beam indication method. As shown in FIG. 8, the method includes the following steps S801 to S806.

S801. A terminal sends a request message to a network device, where the request message is used to request the network device to obtain scheduling time information of at least one beam.

The scheduling time information of the at least one beam includes scheduling time information of a first beam currently accessed by the terminal, and is used to instruct the terminal to receive or send a signal at a scheduling time indicated by the scheduling time information of the at least one beam.

S802. The network device receives the request message sent by the terminal.

S803. The network device obtains the scheduling time information of the at least one beam based on the request message.

S804. The network device sends first indication information to the terminal, where the first indication information is used to indicate the scheduling time information of the at least one beam.

S805. The terminal receives the first indication information sent by the network device.

S806. The terminal receives or sends, based on the first indication information, a signal at a scheduling time indicated by the scheduling time information of the at least one beam.

For description of steps related to the embodiment in FIG. 4 in this embodiment of the present invention, refer to the embodiment in FIG. 4. Details are not described herein again.

That is, in this embodiment of the present invention, the network device obtains the scheduling time information of the at least one beam only after receiving, from the terminal, the request message for requesting to obtain the scheduling time information of the at least one beam. This solution is more feasible when a beam accessed by the terminal does not change frequently.

For example, when the first beam currently accessed by the terminal does not change frequently, the terminal may send, to the network device, a request message for requesting to obtain the scheduling time information of the first beam. In this way, after the network device sends, to the terminal, the indication information indicating the scheduling time information of the first beam, because the first beam does not change frequently, the scheduling time information of the first beam may be valid for a relatively long time.

Certainly, the terminal may also send, to the network device, indication information indicating whether the scheduling time information indicated by the network device is suitable for the terminal. If the indication information indicates that the scheduling time information indicated by the network device is suitable for the terminal, the network device obtains the scheduling time information of the at least one beam.

For example, when the first beam currently accessed by the terminal does not change frequently, the terminal may send, to the network device, indication information indicating that the scheduling time information indicated by the network device is suitable for the terminal, so that the network device can obtain a scheduling time of the first beam based on the indication information, and send, to the terminal, the indication information indicating the scheduling time information of the first beam. Because the first beam does not change frequently, the scheduling time information of the first beam may be valid for a relatively long time.

Figure 9:
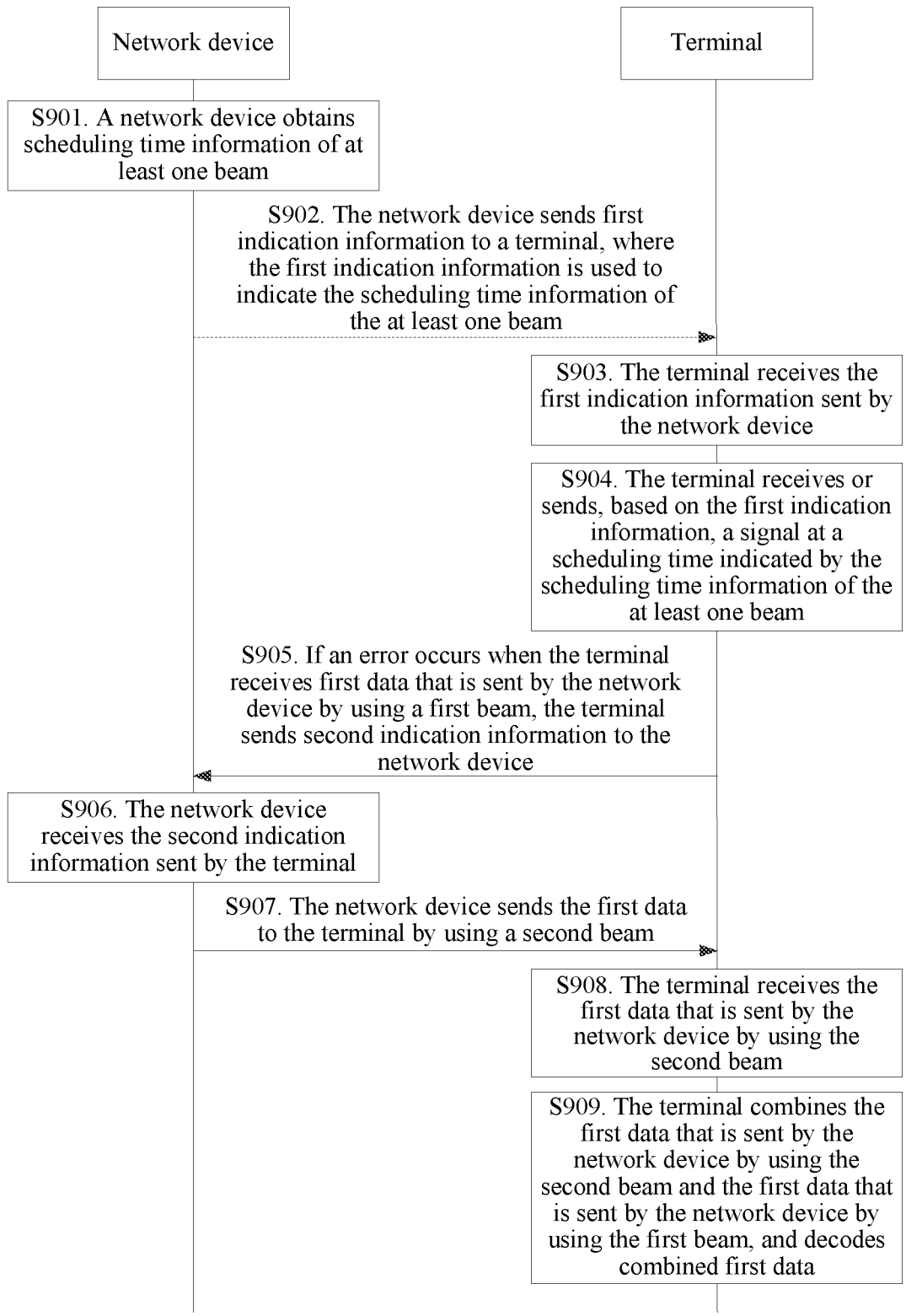
FIG. 9 is a schematic flowchart of still another beam indication method according to an embodiment of the present invention.

Optionally, an embodiment of the present invention further provides a beam indication method. As shown in FIG. 9, the method includes the following steps S901 to S909.

S901. A network device obtains scheduling time information of at least one beam.

The scheduling time information of the at least one beam includes scheduling time information of a first beam currently accessed by a terminal, and is used to instruct the terminal to receive or send a signal at a scheduling time indicated by the scheduling time information of the at least one beam.

S902. The network device sends first indication information to a terminal, where the first indication information is used to indicate the scheduling time information of the at least one beam.

S903. The terminal receives the first indication information sent by the network device.

S904. The terminal receives or sends, based on the first indication information, a signal at a scheduling time indicated by the scheduling time information of the at least one beam.

S905. If an error occurs when the terminal receives first data that is sent by the network device using a first beam, the terminal sends second indication information to the network device, where the second indication information is used to indicate that an error occurs when the network device sends the first data using the first beam.

S906. The network device receives the second indication information sent by the terminal.

S907. The network device sends the first data to the terminal using a second beam.

The second beam is a beam of the at least one beam.

S908. The terminal receives the first data that is sent by the network device using the second beam.

S909. The terminal combines the first data that is sent by the network device using the second beam and the first data that is sent by the network device using the first beam, and decodes combined first data.

For description of steps related to the embodiment in FIG. 4 in this embodiment of the present invention, refer to the embodiment in FIG. 4. Details are not described herein again.

According to the beam indication method provided in this embodiment of the present invention, the data can be retransmitted after a data transmission error occurs. Therefore, reception performance of the terminal can be improved.

For example, the network device may notify, using signaling, the terminal that the terminal may combine data in a plurality of beams, or specify through negotiation that the terminal may combine data in a plurality of beams. When the network device schedules data, if data sent in a beam 1 is not correctly received by the terminal, the network device may retransmit the data at a scheduling moment of a beam 2. When the terminal determines that data sent in a beam is retransmitted data, the terminal may perform, based on a HARQ ID in the data, HARQ combination on the retransmitted data and latest data that is not correctly received in another beam and that has a same HARQ ID, and decode combined data, thereby improving reception performance of the terminal.

Optionally, a similar method may also be used to combine uplink data in a plurality of beams in an uplink signal transmission process, to improve reception performance of the network device. Details are not described in this embodiment of the present invention.

Further, in a current system, if a terminal is handed over between two different TPs or cells, the terminal first needs to stop data transmission in a source beam, wait for a random access resource for a target beam, initiate random access in the target beam, and then transmit data in the target beam. This causes a service to be interrupted for some time in a handover process. Therefore, an embodiment of the present invention further provides a beam indication method, to resolve the problem that a service is interrupted for some time in a handover process.

Figure 10:
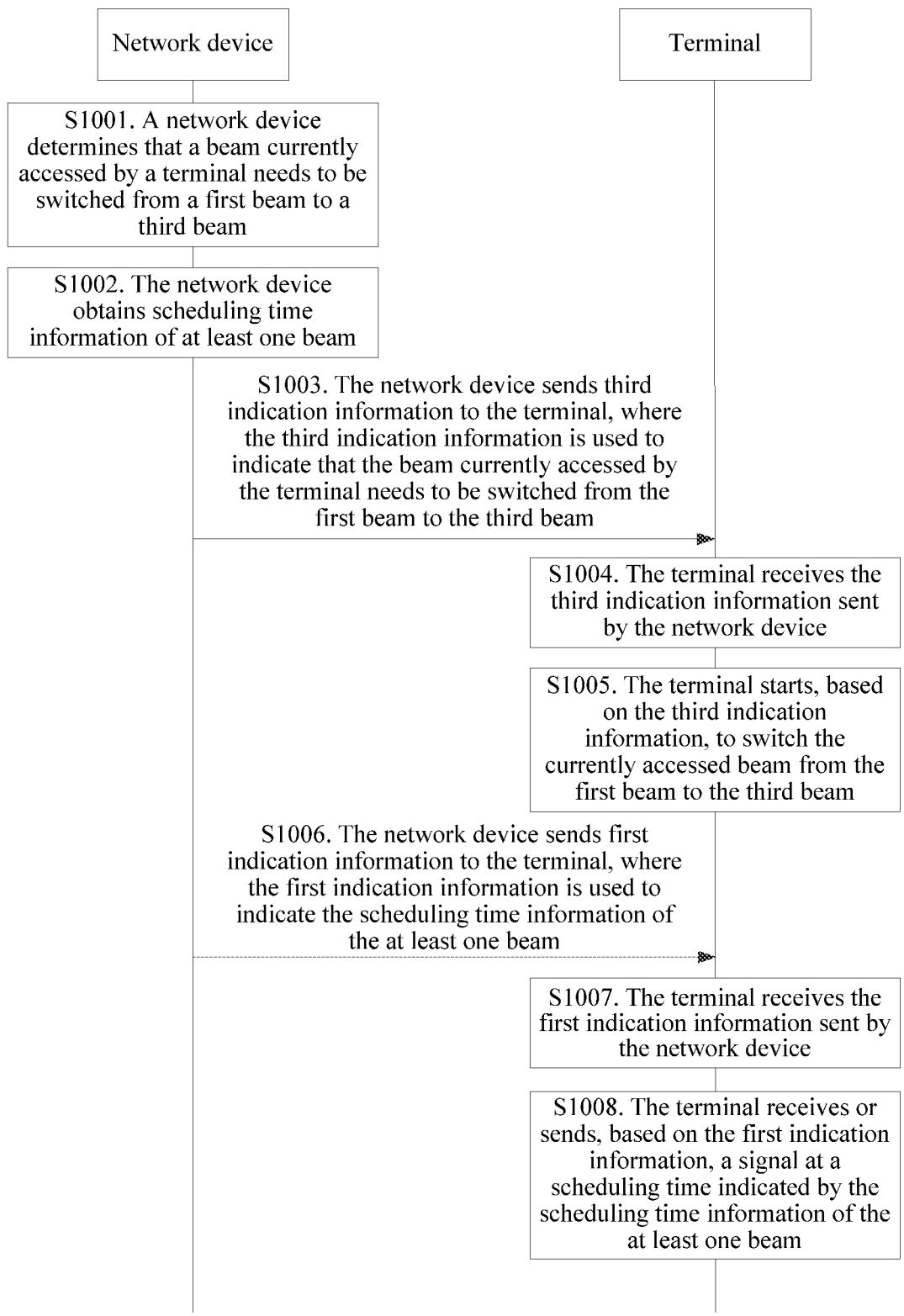
FIG. 10 is a schematic flowchart of still another beam indication method according to an embodiment of the present invention.

FIG. 10 shows a beam indication method according to an embodiment of the present invention. The method includes the following steps.

S1001. A network device determines that a beam currently accessed by a terminal needs to be switched from a first beam to a third beam.

S1002. The network device obtains scheduling time information of at least one beam.

The scheduling time information of the at least one beam includes scheduling time information of the first beam currently accessed by the terminal and scheduling time information of the third beam, and is used to instruct the terminal to receive or send a signal at a scheduling time indicated by the scheduling time information of the at least one beam.

S1003. The network device sends third indication information to the terminal, where the third indication information is used to indicate that the beam currently accessed by the terminal needs to be switched from the first beam to the third beam.

S1004. The terminal receives the third indication information sent by the network device.

S1005. The terminal starts, based on the third indication information, to switch the currently accessed beam from the first beam to the third beam.

S1006. The network device sends first indication information to the terminal, where the first indication information is used to indicate the scheduling time information of the at least one beam.

S1007. The terminal receives the first indication information sent by the network device.

S1008. The terminal receives or sends, based on the first indication information, a signal at a scheduling time indicated by the scheduling time information of the at least one beam.

For description of steps related to the embodiment in FIG. 4 in this embodiment of the present invention, refer to the embodiment in FIG. 4. Details are not described herein again.

In step S1001 in this embodiment of the present invention, the network device may determine, after receiving a measurement report reported by the terminal, that the beam currently accessed by the terminal needs to be switched from the first beam to the third beam; or the network device may determine, based on an uplink measurement result, that the beam currently accessed by the terminal needs to be switched from the first beam to the third beam. This is not specifically limited in this embodiment of the present invention.

In step S1002 in this embodiment of the present invention, when the network device in this embodiment of the present invention is specifically a TP managed by a base station, after the network device determines that the beam currently accessed by the terminal needs to be switched from the first beam to the third beam, if a TP to which the first beam belongs is different from a TP to which the third beam belongs, the TP to which the first beam belongs may further send a switching request message to the TP to which the third beam belongs, to request the scheduling time information of the third beam. After receiving the switching request message, the TP to which the third beam belongs allocates a corresponding scheduling moment to the terminal, and notifies the TP to which the first beam belongs of the scheduling time information of the third beam, so that the TP to which the first beam belongs can obtain the scheduling time information of the third beam.

There is no necessary execution order between steps S1003 to S1005 and steps S1006 to S1008 in this embodiment of the present invention. Steps S1003 to S1005 may be performed before steps S1006 to S1008; or steps S1006 to S1008 may be performed before steps S1003 to S1005; or steps S1003 to S1005 and steps S1006 to S1008 may be simultaneously performed. This is not specifically limited in this embodiment of the present invention.

In this embodiment of the present invention, the first indication information and the third indication information may be carried using different messages, for example, may both be carried by using a broadcast message, a MAC control element message, or an RRC message; or may be carried by using different messages, for example, the first indication information is carried by using a MAC control element message, and the third indication information is carried by using an RRC message. This is not specifically limited in this embodiment of the present invention.

In step S1008 in this embodiment of the present invention, the terminal may listen to scheduling control information (for example, a PDCCH) of the first beam or the third beam within a corresponding time based on the first indication information, to determine whether the network device schedules the terminal in the corresponding beam. In other words, the terminal may receive, based on the first indication information, a downlink signal at a scheduling time indicated by the scheduling time information of the first beam or the scheduling time information of the third beam; or the terminal may send, based on the first indication information, an uplink signal at a scheduling time indicated by the scheduling time information of the first beam or the scheduling time information of the third beam; or the terminal may perform, based on the first indication information, a random access procedure at a scheduling time indicated by the scheduling time information of the first beam or the scheduling time information of the third beam.

In this embodiment of the present invention, because scheduling time information of a target beam (corresponding to the third beam in FIG. 10) and a source beam (corresponding to the first beam in FIG. 10) can be obtained in a switching process, the terminal can perform data transmission based on the scheduling time information in the switching process, thereby reducing a service interruption time.

Figure 11A:
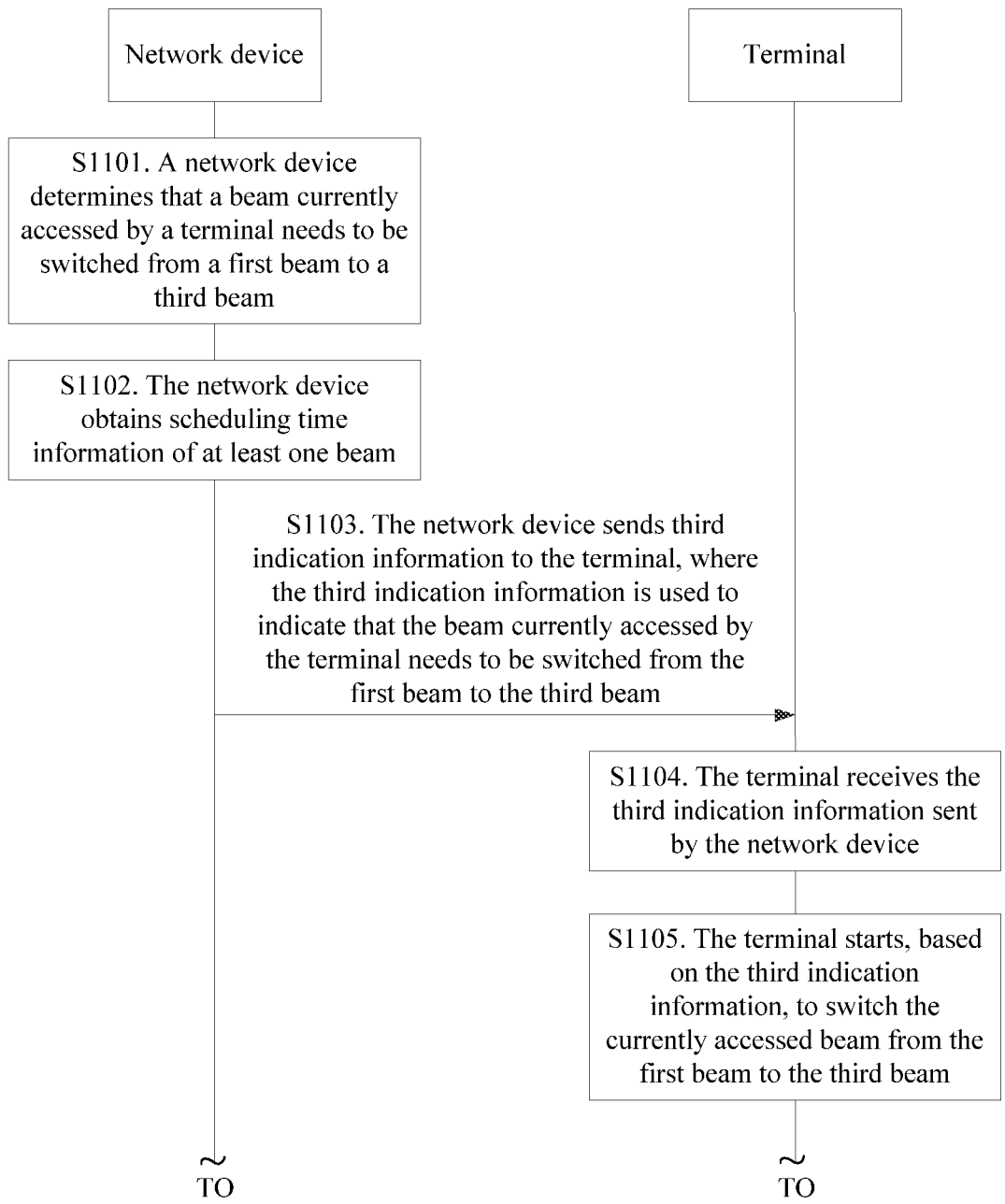
FIG. 11A and FIG. 11B are a schematic flowchart of still another beam indication method according to an embodiment of the present invention.
Figure 11B:
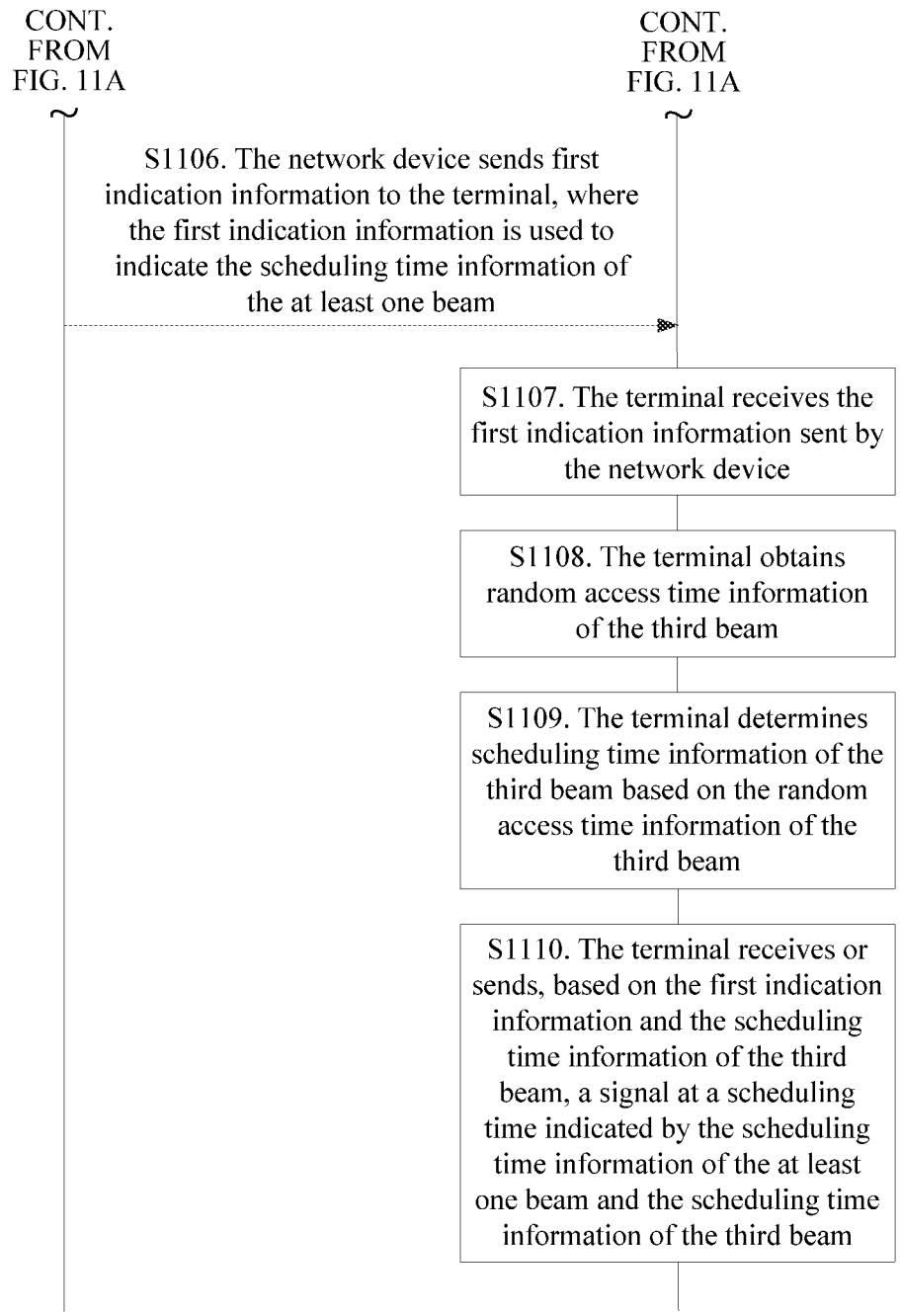

Optionally, FIG. 11A and FIG. 11B show another beam indication method according to an embodiment of the present invention. The method includes the following steps.

Snot A network device determines that a beam currently accessed by a terminal needs to be switched from a first beam to a third beam.

S1102. The network device obtains scheduling time information of at least one beam.

The scheduling time information of the at least one beam includes scheduling time information of the first beam currently accessed by the terminal, and is used to instruct the terminal to receive or send a signal at a scheduling time indicated by the scheduling time information of the at least one beam.

S1103. The network device sends third indication information to the terminal, where the third indication information is used to indicate that the beam currently accessed by the terminal needs to be switched from the first beam to the third beam.

S1104. The terminal receives the third indication information sent by the network device.

S1105. The terminal starts, based on the third indication information, to switch the currently accessed beam from the first beam to the third beam.

S1106. The network device sends first indication information to the terminal, where the first indication information is used to indicate the scheduling time information of the at least one beam.

S1107. The terminal receives the first indication information sent by the network device.

S1108. The terminal obtains random access time information of the third beam.

S1109. The terminal determines scheduling time information of the third beam based on the random access time information of the third beam.

S1110. The terminal receives or sends, based on the first indication information and the scheduling time information of the third beam, a signal at a scheduling time indicated by the scheduling time information of the at least one beam and the scheduling time information of the third beam.

For description of steps related to the embodiment in FIG. 4 in this embodiment of the present invention, refer to the embodiment in FIG. 4. Details are not described herein again.

For description of steps related to the embodiment in FIG. 10 in this embodiment of the present invention, refer to the embodiment in FIG. 10. Details are not described herein again.

Similar to the embodiment in FIG. 10, there is no necessary execution order between steps S1103 to S1105 and steps S1106 to S1110 in this embodiment of the present invention. Steps S1103 to S1105 may be performed before steps S1106 to S1110; or steps S1106 to S1110 may be performed before steps S1103 to S1105; or steps S1103 to S1105 and steps S1106 to S1110 may be simultaneously performed. This is not specifically limited in this embodiment of the present invention.

Different from the embodiment in FIG. 10, in the beam indication method provided in this embodiment of the present invention, a scheduling time of the third beam is determined by the terminal using the random access information of the third beam obtained from the network device side. However, in the beam indication method provided in FIG. 10, the scheduling time of the third beam is directly notified to the terminal by the network device.

In this embodiment of the present invention, because scheduling time information of a target beam (corresponding to the third beam in FIG. 11A and FIG. 11B) and a source beam (corresponding to the first beam in FIG. 11A and FIG. 11B) can be obtained in a switching process, the terminal can perform data transmission based on the scheduling time information in the switching process, thereby reducing a service interruption time.

Figure 12:
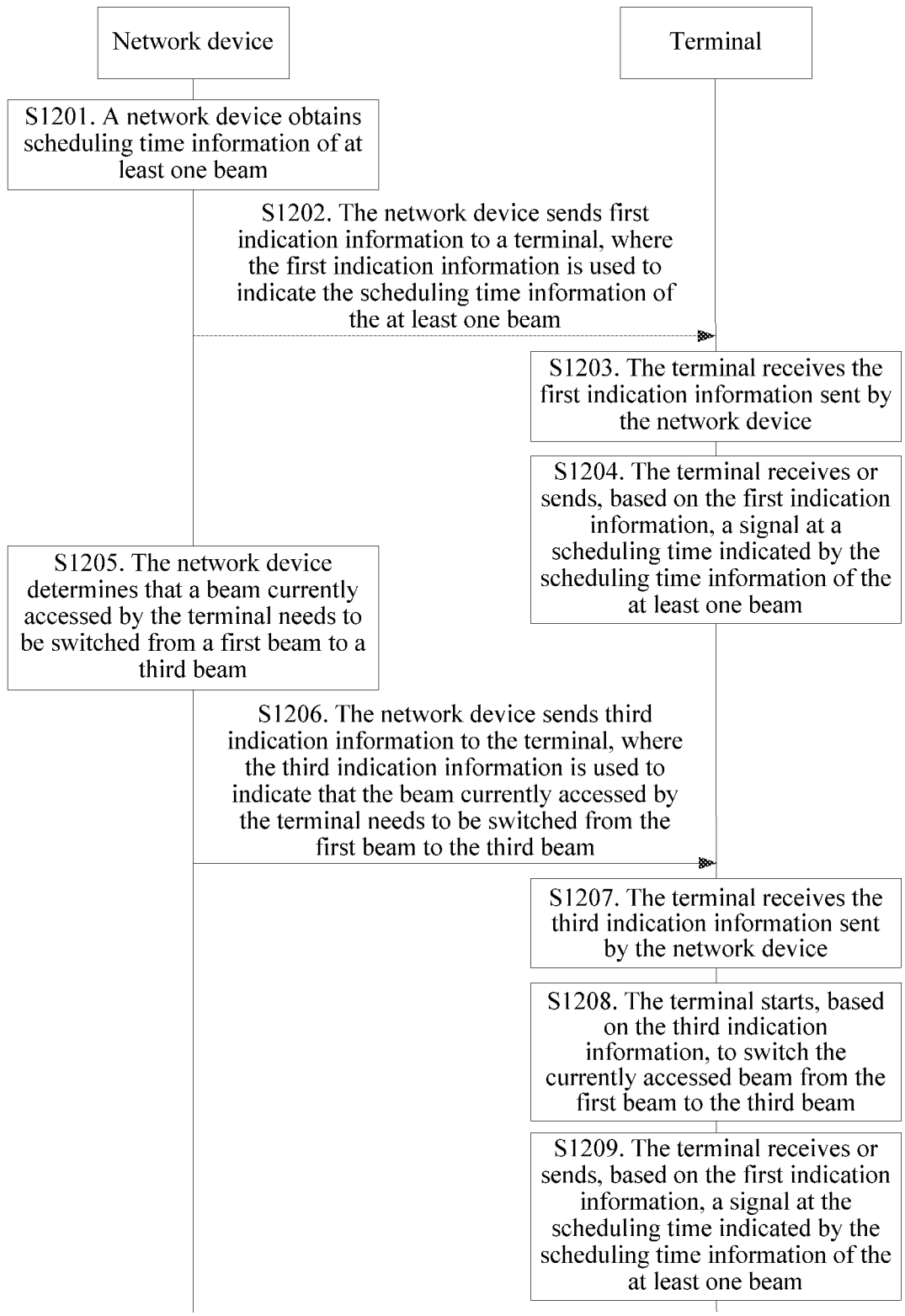
FIG. 12 is a schematic flowchart of still another beam indication method according to an embodiment of the present invention.

Optionally, FIG. 12 shows another beam indication method according to an embodiment of the present invention. The method includes the following steps.

S1201. A network device obtains scheduling time information of at least one beam.

The scheduling time information of the at least one beam includes scheduling time information of a first beam currently accessed by a terminal and scheduling time information of a third beam, and is used to instruct the terminal to receive or send a signal at a scheduling time indicated by the scheduling time information of the at least one beam.

S1202. The network device sends first indication information to a terminal, where the first indication information is used to indicate the scheduling time information of the at least one beam.

S1203. The terminal receives the first indication information sent by the network device.

S1204. The terminal receives or sends, based on the first indication information, a signal at a scheduling time indicated by the scheduling time information of the at least one beam.

S1205. The network device determines that a beam currently accessed by the terminal needs to be switched from a first beam to a third beam.

S1206. The network device sends third indication information to the terminal, where the third indication information is used to indicate that the beam currently accessed by the terminal needs to be switched from the first beam to the third beam.

S1207. The terminal receives the third indication information sent by the network device.

S1208. The terminal starts, based on the third indication information, to switch the currently accessed beam from the first beam to the third beam.

S1209. The terminal receives or sends, based on the first indication information, a signal at the scheduling time indicated by the scheduling time information of the at least one beam.

There is no necessary execution order between step S1208 and step S1209 in this embodiment of the present invention. Step S1208 may be performed before step S1209; or step S1209 may be performed before S1209; or step S1208 and step S1209 may be simultaneously performed. This is not specifically limited in this embodiment of the present invention.

For description of steps related to the embodiment in FIG. 4 in this embodiment of the present invention, refer to the embodiment in FIG. 4. Details are not described herein again.

For description of steps related to the embodiment in FIG. 10 in this embodiment of the present invention, refer to the embodiment in FIG. 10. Details are not described herein again.

In the beam indication method provided in this embodiment of the present invention, because scheduling time information of a target beam (corresponding to the third beam in FIG. 12) and a source beam (corresponding to the first beam in FIG. 12) can be obtained in a switching process in this embodiment of the present invention, the terminal can perform data transmission based on the scheduling time information in the switching process, thereby reducing a service interruption time. In addition, the network device may send, to the terminal before switching, the first indication information indicating the scheduling time information of the at least one beam, where the scheduling time information of the at least one beam includes the scheduling time information of the first beam currently accessed by the terminal, and is used to instruct the terminal to receive or send a signal at the scheduling time indicated by the scheduling time information of the at least one beam. In this way, at least the terminal does not need to listen to scheduling control information (for example, a PDCCH) at a time other than a scheduling time indicated by the scheduling time information of the first beam currently accessed by the terminal. This matches the scheduling time arrangement made by a network side for a terminal in coverage of the first beam, and reduces power consumption of the terminal, or can cause the terminal to perform some other measurement actions, for example, measuring signal quality of each beam.

Figure 13A:
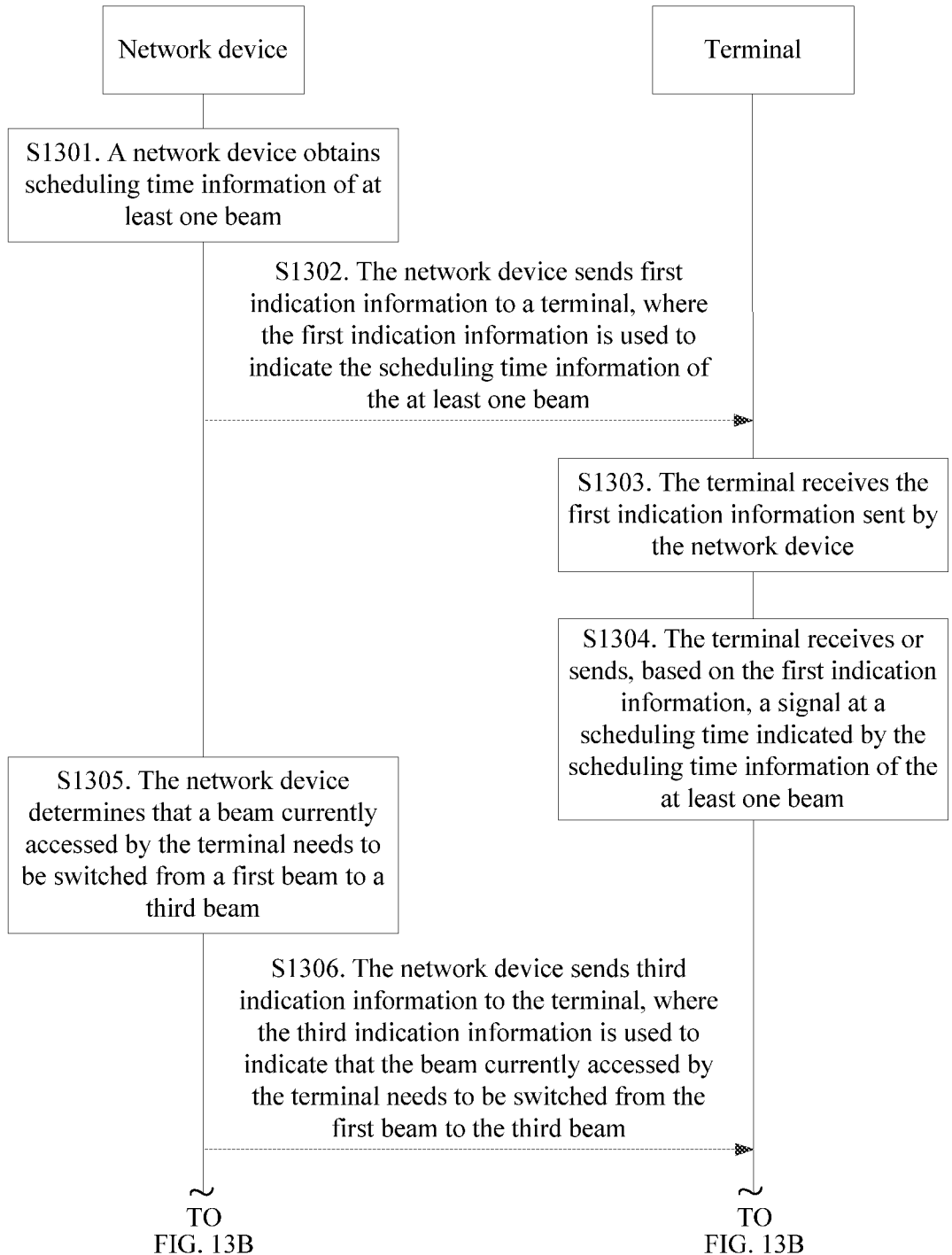
FIG. 13A and FIG. 13B are a schematic flowchart of still another beam indication method according to an embodiment of the present invention.
Figure 13B:
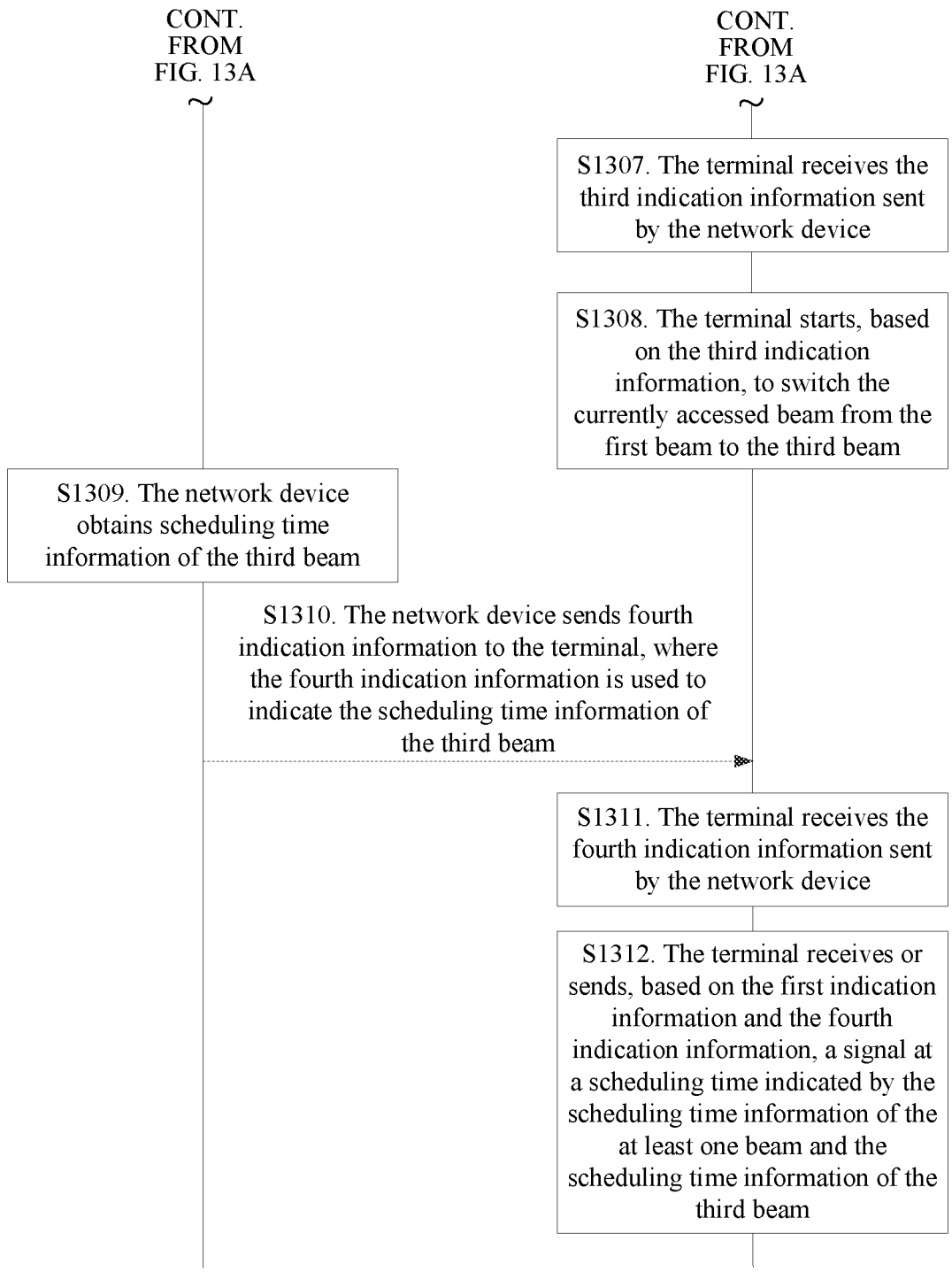

Optionally, FIG. 13A and FIG. 13B show another beam indication method according to an embodiment of the present invention. The method includes the following steps.

S1301. A network device obtains scheduling time information of at least one beam.

The scheduling time information of the at least one beam includes scheduling time information of a first beam currently accessed by a terminal, and is used to instruct the terminal to receive or send a signal at a scheduling time indicated by the scheduling time information of the at least one beam.

S1302. The network device sends first indication information to a terminal, where the first indication information is used to indicate the scheduling time information of the at least one beam.

S1303. The terminal receives the first indication information sent by the network device.

S1304. The terminal receives or sends, based on the first indication information, a signal at a scheduling time indicated by the scheduling time information of the at least one beam.

S1305. The network device determines that a beam currently accessed by the terminal needs to be switched from a first beam to a third beam.

S1306. The network device sends third indication information to the terminal, where the third indication information is used to indicate that the beam currently accessed by the terminal needs to be switched from the first beam to the third beam.

S1307. The terminal receives the third indication information sent by the network device.

S1308. The terminal starts, based on the third indication information, to switch the currently accessed beam from the first beam to the third beam.

S1309. The network device obtains scheduling time information of the third beam.

S1310. The network device sends fourth indication information to the terminal, where the fourth indication information is used to indicate the scheduling time information of the third beam.

S1311. The terminal receives the fourth indication information sent by the network device.

S1312. The terminal receives or sends, based on the first indication information and the fourth indication information, a signal at a scheduling time indicated by the scheduling time information of the at least one beam and the scheduling time information of the third beam.

For description of steps related to the embodiment in FIG. 4 in this embodiment of the present invention, refer to the embodiment in FIG. 4. Details are not described herein again.

For description of steps related to the embodiment in FIG. 10 in this embodiment of the present invention, refer to the embodiment in FIG. 10. Details are not described herein again.

There is no necessary execution order between steps S1306 to S1308 and steps S1309 to S1312 in this embodiment of the present invention. Steps S1306 to S1308 may be performed before steps S1309 to S1312; or steps S1309 to S1312 may be performed before steps S1306 to S1308; or steps S1306 to S1308 and steps S1309 to S1312 may be simultaneously performed. This is not specifically limited in this embodiment of the present invention.

In this embodiment of the present invention, the fourth indication information and the third indication information may be carried by using different messages, for example, may both be carried using a broadcast message, a MAC control element message, or an RRC message; or may be carried using different messages, for example, the fourth indication information is carried using a MAC control element message, and the third indication information is carried using an RRC message. This is not specifically limited in this embodiment of the present invention.

Different from the embodiment in FIG. 12, in the beam indication method provided in this embodiment of the present invention, a scheduling time of the third beam is obtained and sent to the terminal by the network device after the network device determines that switching is required. However, in the beam indication method provided in FIG. 12, a scheduling time of the third beam is notified to the terminal using the scheduling time information of the at least one beam, before the network device determines that switching is required.

In the beam indication method provided in this embodiment of the present invention, because scheduling time information of a target beam (corresponding to the third beam in FIG. 13A and FIG. 13B) and a source beam (corresponding to the first beam in FIG. 13A and FIG. 13B) can be obtained in a switching process in this embodiment of the present invention, the terminal can perform data transmission based on the scheduling time information in the switching process, thereby reducing a service interruption time. In addition, the network device may send, to the terminal before switching, the first indication information indicating the scheduling time information of the at least one beam, where the scheduling time information of the at least one beam includes the scheduling time information of the first beam currently accessed by the terminal, and is used to instruct the terminal to receive or send a signal at the scheduling time indicated by the scheduling time information of the at least one beam. In this way, at least the terminal does not need to listen to scheduling control information (for example, a PDCCH) at a time other than a scheduling time indicated by the scheduling time information of the first beam currently accessed by the terminal. This matches the scheduling time arrangement made by a network side for a terminal in coverage of the first beam, and reduces power consumption of the terminal, or can cause the terminal to perform some other measurement actions, for example, measuring signal quality of each beam.

Figure 14A:
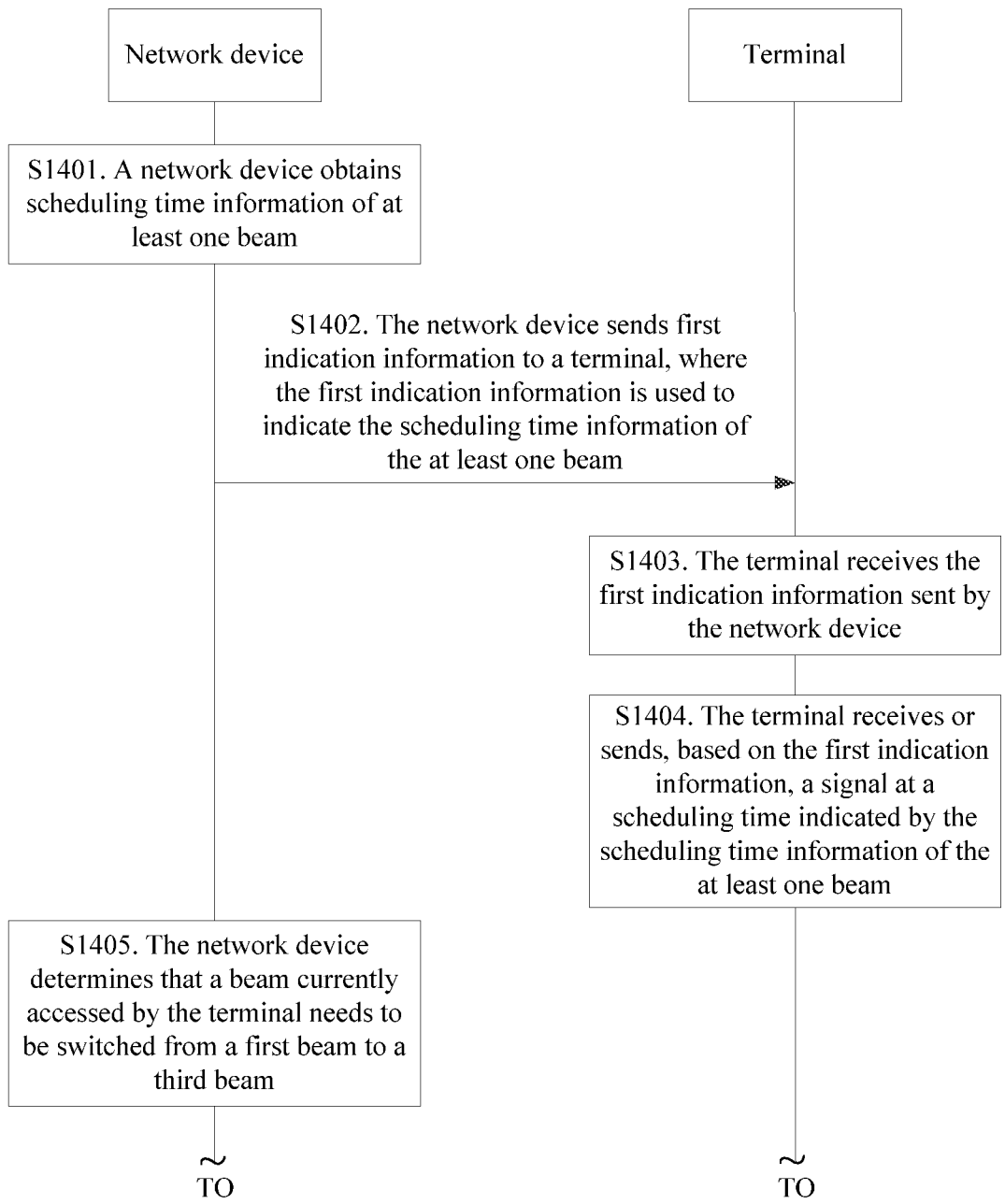

Optionally, FIG. 14A and FIG. 14B show still another beam indication method according to an embodiment of the present invention. The method includes the following steps.

S1401. A network device obtains scheduling time information of at least one beam.

The scheduling time information of the at least one beam includes scheduling time information of a first beam currently accessed by a terminal, and is used to instruct the terminal to receive or send a signal at a scheduling time indicated by the scheduling time information of the at least one beam.

S1402. The network device sends first indication information to a terminal, where the first indication information is used to indicate the scheduling time information of the at least one beam.

S1403. The terminal receives the first indication information sent by the network device.

S1404. The terminal receives or sends, based on the first indication information, a signal at a scheduling time indicated by the scheduling time information of the at least one beam.

S1405. The network device determines that a beam currently accessed by the terminal needs to be switched from a first beam to a third beam.

S1406. The network device sends third indication information to the terminal, where the third indication information is used to indicate that the beam currently accessed by the terminal needs to be switched from the first beam to the third beam.

S1407. The terminal receives the third indication information sent by the network device.

S1408. The terminal starts, based on the third indication information, to switch the currently accessed beam from the first beam to the third beam.

S1409. The terminal obtains random access time information of the third beam.

S1410. The terminal determines scheduling time information of the third beam based on the random access time information of the third beam.

S1411. The terminal receives or sends, based on the first indication information and the scheduling time information of the third beam, a signal at a scheduling time indicated by the scheduling time information of the at least one beam and the scheduling time information of the third beam.

For description of steps related to the embodiment in FIG. 4 in this embodiment of the present invention, refer to the embodiment in FIG. 4. Details are not described herein again.

For description of steps related to the embodiment in FIG. 10 in this embodiment of the present invention, refer to the embodiment in FIG. 10. Details are not described herein again.

There is no necessary execution order between steps S1406 to S1408 and steps S1409 to S1411 in this embodiment of the present invention. Steps S1406 to S1408 may be performed before steps S1409 to S1411; or steps S1409 to S1411 may be performed before steps S1406 to S1408; or steps S1406 to S1408 and steps S1409 to S1411 may be simultaneously performed. This is not specifically limited in this embodiment of the present invention.

Different from the embodiments in FIG. 12 and FIG. 13A and FIG. 13B, in the beam indication method provided in this embodiment of the present invention, a scheduling time of the third beam is determined by the terminal using the random access information of the third beam obtained from the network device side. However, in the beam indication methods provided in FIG. 12 and FIG. 13A and FIG. 13B, the scheduling time of the third beam is directly notified to the terminal by the network device.

In the beam indication method provided in this embodiment of the present invention, because scheduling time information of a target beam (corresponding to the third beam in FIG. 14A and FIG. 14B) and a source beam (corresponding to the first beam in FIG. 14A and FIG. 14B) can be obtained in a switching process in this embodiment of the present invention, the terminal can perform data transmission based on the scheduling time information in the switching process, thereby reducing a service interruption time. In addition, the network device may send, to the terminal before switching, the first indication information indicating the scheduling time information of the at least one beam, where the scheduling time information of the at least one beam includes the scheduling time information of the first beam currently accessed by the terminal, and is used to instruct the terminal to receive or send a signal at the scheduling time indicated by the scheduling time information of the at least one beam. In this way, at least the terminal does not need to listen to scheduling control information (for example, a PDCCH) at a time other than a scheduling time indicated by the scheduling time information of the first beam currently accessed by the terminal. This matches the scheduling time arrangement made by a network side for a terminal in coverage of the first beam, and reduces power consumption of the terminal, or can cause the terminal to perform some other measurement actions, for example, measuring signal quality of each beam.

The foregoing mainly describes the solutions provided in the embodiments of the present invention from the perspective of a terminal side and a network device side. It can be understood that to implement the foregoing functions, the terminal and the network device include a corresponding hardware structure and/or software module for performing each of the functions. A person skilled in the art should be easily aware that the units and algorithm steps in the examples described with reference to the embodiments disclosed in this specification may be implemented by hardware or a combination of hardware and computer software in the present invention. Whether the functions are performed by hardware or computer software driving hardware depends on particular applications and design constraints of the technical solutions. A person skilled in the art may use a different method to implement the described function for each particular application, but it should not be considered that the implementation goes beyond the scope of the present invention.

In the embodiments of the present invention, function modules of the terminal may be divided based on the foregoing method examples. For example, the function modules may be divided based on functions, or two or more functions may be integrated into one processing module. The integrated module may be implemented in a form of hardware, or may be implemented in a form of a function module of software. It should be noted that the module division in the embodiments of the present invention is an example, and is merely logical function division. There may be another division manner in actual implementation.

Figure 15:
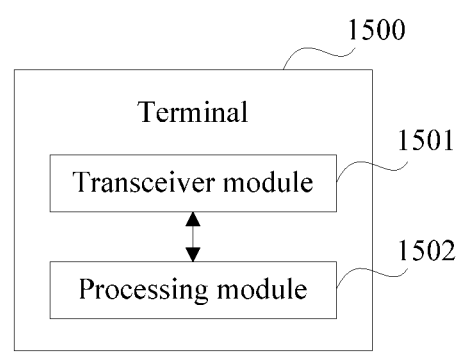
FIG. 15 is a schematic structural diagram of a terminal according to an embodiment of the present invention.

FIG. 15 is a possible schematic structural diagram of the terminal whose units are integrated in the foregoing embodiments. A terminal 1500 includes a transceiver module 1501 and a processing module 1502. The transceiver module 1501 is configured to enable the terminal 1500 to perform steps S503 and S504 in FIG. 5; or the transceiver module 1501 is configured to enable the terminal 1500 to perform steps S801, S805, and S806 in FIG. 8; or the transceiver module 1501 is configured to enable the terminal 1500 to perform steps S903, S904, S905, and S908 in FIG. 9, and the processing module 1502 is configured to enable the terminal 1500 to perform step S909 in FIG. 9; or the transceiver module 1501 is configured to enable the terminal 1500 to perform steps S1004, S1007, and S1008 in FIG. 10, and the processing module 1502 is configured to enable the terminal 1500 to perform step S1005 in FIG. 10; or the transceiver module 1501 is configured to enable the terminal 1500 to perform steps S1104, S1107, and S1110 in FIG. 11A and FIG. 11B, and the processing module 1502 is configured to enable the terminal 1500 to perform steps S1105, S1108, and S1109 in FIG. 11A and FIG. 11B; or the transceiver module 1501 is configured to enable the terminal 1500 to perform steps S1203, S1204, S1207, and S1209 in FIG. 12, and the processing module 1502 is configured to enable the terminal 1500 to perform step S1208 in FIG. 12; or the transceiver module 1501 is configured to enable the terminal 1500 to perform steps S1303, S1304, S1307, S1311, and S1312 in FIG. 13A and FIG. 13B, and the processing module 1502 is configured to enable the terminal 1500 to perform step S1308 in FIG. 13B; or the transceiver module 1501 is configured to enable the terminal 1500 to perform steps S1403, S1404, S1407, and S1411 in FIG. 14A and FIG. 14B, and the processing module 1502 is configured to enable the terminal 1500 to perform steps S1408, S1409, and S1410 in FIG. 14B. Certainly, the terminal 1500 may further include a storage module 1503, configured to store program code and data of the terminal 1500. This is not specifically limited in this embodiment of the present invention.

The processing module 1502 may be a processor or a controller, for example, may be the processor 401 in FIG. 4, a general-purpose processor, a digital signal processor (DSP), an application-specific integrated circuit (ASIC), a field programmable gate array (FPGA) or another programmable logic device, a transistor logic device, a hardware component, or any combination thereof. It may implement or execute various example logical blocks, modules, and circuits described with reference to the content disclosed in the present invention. The processing module 1502 may alternatively be a combination for implementing a computing function, for example, a combination including one or more microprocessors or a combination of a DSP and a microprocessor.

The transceiver module 1501 may be a transceiver, a transceiver circuit, a communications interface, or the like.

The storage module 1503 may be a memory.

When the transceiver module 1501 is a transceiver, the processing module 1502 is a processor, and the storage module 1503 is a memory, the terminal in this embodiment of the present invention may be the terminal shown in FIG. 4. For details, refer to the related descriptions in the part of FIG. 4. Details are not described herein again.

According to the terminal provided in this embodiment of the present invention, in this embodiment of the present invention, the terminal may receive, from a network device, first indication information indicating scheduling time information of at least one beam. The scheduling time information of the at least one beam includes scheduling time information of a first beam currently accessed by the terminal, and is used to instruct the terminal to receive or send a signal at a scheduling time indicated by the scheduling time information of the at least one beam. In this way, at least the terminal does not need to listen to scheduling control information (for example, a PDCCH) at a time other than a scheduling time indicated by the scheduling time information of the first beam currently accessed by the terminal. This matches the scheduling time arrangement made by a network side for a terminal in coverage of the first beam, and reduces power consumption of the terminal, or can cause the terminal to perform some other measurement actions, for example, measuring signal quality of each beam.

Figure 16:
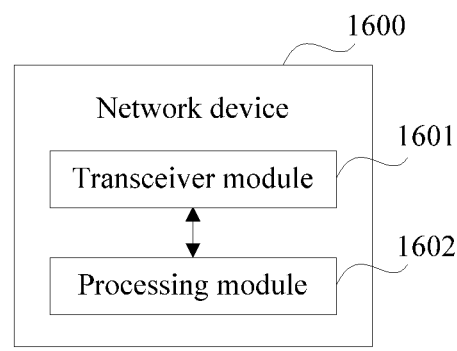
FIG. 16 is a schematic structural diagram of a network device according to an embodiment of the present invention.

FIG. 16 is a possible schematic structural diagram of the network device whose units are integrated in the foregoing embodiments. A network device 1600 includes a transceiver module 1601 and a processing module 1602. The processing module 1602 is configured to enable the network device 1600 to perform step S501 in FIG. 5, and the transceiver module 1601 is configured to enable the network device 1600 to perform step S502 in FIG. 5; or the transceiver module 1601 is configured to enable the network device 1600 to perform steps S802 and S804 in FIG. 8, and the processing module 1602 is configured to enable the network device 1600 to perform step S803 in FIG. 8; or the processing module 1602 is configured to enable the network device 1600 to perform step S901 in FIG. 9, and the transceiver module 1601 is configured to enable the network device 1600 to perform steps S902, S906, and S907 in FIG. 9; or the processing module 1602 is configured to enable the network device 1600 to perform steps S1001 and S1002 in FIG. 10, and the transceiver module 1601 is configured to enable the network device 1600 to perform steps S1003 and S1006 in FIG. 10; or the processing module 1602 is configured to enable the network device 1600 to perform steps S1110 and S1102 in FIG. 11A, and the transceiver module 1601 is configured to enable the network device 1600 to perform steps S1103 and S1106 in FIG. 11A and FIG. 11B; or the processing module 1602 is configured to enable the network device 1600 to perform steps S1201 and S1205 in FIG. 12, and the transceiver module 1601 is configured to enable the network device 1600 to perform steps S1202 and S1206 in FIG. 12; or the processing module 1602 is configured to enable the network device 1600 to perform steps S1301, S1305, and S1309 in FIG. 13A and FIG. 13B, and the transceiver module 1601 is configured to enable the network device 1600 to perform steps S1302, S1306, and S1310 in FIG. 13A and FIG. 13B; or the processing module 1602 is configured to enable the network device 1600 to perform steps S1401 and S1405 in FIG. 14A, and the transceiver module 1601 is configured to enable the network device 1600 to perform steps S1402 and S1406 in FIG. 14A and FIG. 14B. Certainly, the network device 1600 may further include a storage module 1603, configured to store program code and data of the network device 1600. This is not specifically limited in this embodiment of the present invention.

The processing module 1602 may be a processor or a controller, for example, may be the processor 301 in FIG. 3, a general-purpose processor, a digital signal processor (DSP), an application-specific integrated circuit (ASIC), a field programmable gate array (FPGA) or another programmable logic device, a transistor logic device, a hardware component, or any combination thereof. It may implement or execute various example logical blocks, modules, and circuits described with reference to the content disclosed in the present invention. The processor may alternatively be a combination for implementing a computing function, for example, a combination including one or more microprocessors or a combination of a DSP and a microprocessor.

The transceiver module 1601 may be a transceiver, a transceiver circuit, a communications interface, or the like.

The storage module 1603 may be a memory.

When the transceiver module 1601 is a transceiver, the processing module 1602 is a processor, and the storage module 1603 is a memory, the network device in this embodiment of the present invention may be the network device shown in FIG. 3. For details, refer to the related descriptions in the part of FIG. 3. Details are not described herein again.

According to the network device provided in this embodiment of the present invention, in this embodiment of the present invention, the network device may obtain scheduling time information of at least one beam, and send, to a terminal, first indication information indicating the scheduling time information of the at least one beam. The scheduling time information of the at least one beam includes scheduling time information of a first beam currently accessed by the terminal, and is used to instruct the terminal to receive or send a signal at a scheduling time indicated by the scheduling time information of the at least one beam. In this way, at least the terminal does not need to listen to scheduling control information (for example, a PDCCH) at a time other than a scheduling time indicated by the scheduling time information of the first beam currently accessed by the terminal. This matches the scheduling time arrangement made by a network side for a terminal in coverage of the first beam, and reduces power consumption of the terminal, or can cause the terminal to perform some other measurement actions, for example, measuring signal quality of each beam.

The methods or algorithm steps described with reference to the content disclosed in the present invention may be implemented in a hardware manner, or may be implemented in a manner of executing a software instruction by a processor. The software instruction may include a corresponding software module. The software module may be stored in a random access memory (RAM), a flash memory, a read-only memory (ROM), an erasable programmable read-only memory (EPROM), an electrically erasable programmable read-only memory (EEPROM), a register, a hard disk, a removable hard disk, a compact disc read-only memory (CD-ROM), or a storage medium in any other forms well-known in the art. An example storage medium is coupled to the processor, so that the processor can read information from the storage medium and write information into the storage medium. Certainly, the storage medium may be a part of the processor. The processor and the storage medium may be located in an ASIC. In addition, the ASIC may be located in a core network interface device. Certainly, the processor and the storage medium may exist in the core network interface device as discrete components.

A person skilled in the art should be aware that in one or more of the foregoing examples, the functions described in the present invention may be implemented by using hardware, software, firmware, or any combination thereof. When the functions are implemented by software, these functions may be stored in a computer-readable medium or transmitted as one or more instructions or code in the computer-readable medium. The computer-readable medium includes a computer storage medium and a communications medium. The communications medium includes any medium that enables a computer program to be transmitted from one place to another. The storage medium may be any available medium accessible to a general or dedicated computer.

The objectives, technical solutions, and beneficial effects of the present invention are further described in detail in the foregoing specific implementations. It should be understood that the foregoing descriptions are merely specific implementations of the present invention, but are not intended to limit the protection scope of the present invention. Any modification, equivalent replacement, or improvement made based on the technical solutions of the present invention shall fall within the protection scope of the present invention.

What is claimed is:

1. A network device, comprising:
   a processor, configured to obtain scheduling time information of at least one beam, wherein the scheduling time information of the at least one beam comprises a mapping relationship between a respective scheduling time of each beam of the at least one beam and the respective beam, or a respective scheduling time of each beam of the at least one beam, the scheduling time information of the at least one beam instructs a terminal to receive or send a signal at least one scheduling time indicated by the scheduling time information of the at least one beam, and the at least one beam comprises a first beam currently accessed by the terminal; and
   a transceiver, configured to send first indication information to the terminal, wherein the first indication information indicates the scheduling time information of the at least one beam.

2. The network device according to claim 1, wherein the at least one beam further comprises a second beam corresponding to the network device, wherein the second beam is different than the first beam.

3. The network device according to claim 1, wherein:
   before the processor obtains the scheduling time information of the at least one beam, the transceiver is further configured to receive a request message sent by the terminal, wherein the request message requests the network device to obtain the scheduling time information of the at least one beam; and
   the processor is configured to obtain the scheduling time information of the at least one beam based on the request message.

4. The network device according to claim 1, wherein:
   after the transceiver sends the first indication information to the terminal, the transceiver is further configured to receive second indication information sent by the terminal, wherein the second indication information indicates that an error occurred when the network device sent first data using the first beam; and
   the transceiver is further configured to resend the first data to the terminal using a second beam, wherein the second beam is comprised in the at least one beam.

5. The network device according to claim 1, wherein the transceiver is further configured to:
   send third indication information to the terminal, wherein the third indication information indicates that a beam currently accessed by the terminal needs to be switched from the first beam to a third beam.

6. The network device according to claim 5, wherein the at least one beam further comprises the third beam.

7. A terminal, comprising:
   a transceiver, configured to:
     receive first indication information sent by a network device, wherein the first indication information indicates scheduling time information of at least one beam, the scheduling time information of the at least one beam comprises a mapping relationship between a respective scheduling time of each beam of the at least one beam and the respective beam, or a respective scheduling time of each beam of the at least one beam, the scheduling time information of the at least one beam instructs the terminal to receive or send a signal at at least one scheduling time indicated by the scheduling time information of the at least one beam, and the at least one beam comprises a first beam currently accessed by a terminal; and
     receive or send, based on the first indication information, a signal at the at least one scheduling time indicated by the scheduling time information of the at least one beam.

8. The terminal according to claim 7, wherein the at least one beam further comprises a second beam corresponding to the network device, wherein the second beam is different than the first beam.

9. The terminal according to claim 7, wherein the transceiver is further configured to:
before receiving the first indication information sent by the network device, send a request message to the network device, wherein the request message requests the network device to obtain the scheduling time information of the at least one beam.

10. The terminal according to claim 7, further comprising:
a processor;
wherein the transceiver is further configured to:
when it is determined that an error has occurred during receiving, by the terminal, of first data that is sent by the network device using the first beam, and after the transceiver sends or receives, based on the first indication information, the signal at the at least one scheduling time indicated by the scheduling time information of the at least one beam, send second indication information to the network device, wherein the second indication information indicates that the error has occurred; and
receive the first data that is re-sent by the network device using a second beam,
wherein the second beam is comprised in the at least one beam; and
wherein the processor is configured to:
combine the first data that is sent by the network device using the second beam and the first data that is re-sent by the network device using the first beam; and
decode the combined first data.

11. The terminal according to claim 7, further comprising:
a processor;
wherein the transceiver is further configured to:
before sending or receiving, based on the first indication information, the signal at the at least one scheduling time indicated by the scheduling time information of the at least one beam, receive third indication information sent by the network device, wherein the third indication information indicates that a beam currently accessed by the terminal needs to be switched from the first beam to a third beam;
wherein the processor is configured to:
obtain random access time information of the third beam; and
determine scheduling time information of the third beam based on the random access time information of the third beam; and
wherein the transceiver is configured to:
receive or send, based on the first indication information and the scheduling time information of the third beam, a signal at a scheduling time indicated by the scheduling time information of the at least one beam and the scheduling time information of the third beam.

12. The terminal according to claim 7, wherein the transceiver is further configured to:
before sending or receiving, based on the first indication information, the signal at the at least one scheduling time indicated by the scheduling time information of the at least one beam, receive third indication information sent by the network device, wherein the third indication information indicates that a beam currently accessed by the terminal needs to be switched from the first beam to a third beam; and
wherein the at least one beam comprises the third beam.

13. A terminal, comprising:
a non-transitory memory;
a processor;
a transceiver; and
a bus, wherein the memory, the processor, and the transceiver are connected using the bus;
wherein the transceiver is configured to perform communication between the terminal and an external device;
wherein the memory is configured to store a computer instruction; and
wherein the processor is configured to execute the computer instruction to:
control the transceiver to receive first indication information sent by a network device, wherein the first indication information indicates scheduling time information of at least one beam, the scheduling time information of the at least one beam comprises a mapping relationship between a respective scheduling time of each beam of the at least one beam and the respective beam, or a respective scheduling time of each beam of the at least one beam, the scheduling time information of the at least one beam instructs the terminal to receive or send a signal at at least one scheduling time indicated by the scheduling time information of the at least one beam, and the at least one beam comprises a first beam currently accessed by the terminal; and
control the transceiver to receive or send, based on the first indication information, a signal at the at least one scheduling time indicated by the scheduling time information of the at least one beam.

14. The terminal according to claim 13, wherein the at least one beam further comprises a second beam corresponding to the network device, wherein the second beam is different than the first beam.

15. The terminal according to claim 13, wherein the transceiver is further configured to:
before receiving the first indication information sent by the network device, send a request message to the network device, wherein the request message requests the network device to obtain the scheduling time information of the at least one beam.

16. The terminal according to claim 15, wherein the transceiver is further configured to:
when it is determined an error has occurred in receiving first data that is sent by the network device using the first beam, and after sending or receiving, based on the first indication information, the signal at the at least one scheduling time indicated by the scheduling time information of the at least one beam, send second indication information to the network device, wherein the second indication information indicates that an error has occurred in receiving the first data sent by the network device using the first beam; and
receive the first data that is re-sent by the network device using a second beam, wherein the second beam is comprised in the at least one beam; and
wherein the processor is further configured to:
combine the first data that is re-sent by the network device using the second beam and the first data that is sent by the network device using the first beam; and
decode combined first data.

17. The terminal according to claim 13, wherein:
the transceiver is further configured to:
before sending or receiving, based on the first indication information, the signal at the at least one scheduling time indicated by the scheduling time information of the at least one beam, receive third indication information sent by the network device, wherein the third indication information indicates that a beam currently accessed by the terminal needs to be switched from the first beam to a third beam;

the processor is further configured to obtain random access time information of the third beam, and determine scheduling time information of the third beam based on the random access time information of the third beam; and the transceiver is further configured to receive or send, based on the first indication information and the scheduling time information of the third beam, a signal at a scheduling time indicated by the scheduling time information of the at least one beam and the scheduling time information of the third beam.

* * * * *